US011178292B2

(12) United States Patent
Kamiya et al.

(10) Patent No.: US 11,178,292 B2
(45) Date of Patent: Nov. 16, 2021

(54) INFORMATION PROCESSING APPARATUS, PROTECTION PROCESSING APPARATUS AND TERMINAL DEVICE FOR LIMITING ACCESS TO A DOCUMENT

(71) Applicant: FUJIFILM BUSINESS INNOVATION CORP., Tokyo (JP)

(72) Inventors: Shigeki Kamiya, Tokyo (JP); Tetsuo Iyoda, Yokohama (JP); Akio Yamashita, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/683,739

(22) Filed: Nov. 14, 2019

(65) Prior Publication Data

US 2020/0084322 A1 Mar. 12, 2020

Related U.S. Application Data

(63) Continuation of application No. PCT/JP2018/024704, filed on Jun. 28, 2018.

(30) Foreign Application Priority Data

Sep. 20, 2017 (JP) .............................. JP2017-180213

(51) Int. Cl.
*H04N 1/00* (2006.01)
*H04N 1/44* (2006.01)

(52) U.S. Cl.
CPC ..... *H04N 1/00206* (2013.01); *H04N 1/00214* (2013.01); *H04N 1/00225* (2013.01); *H04N 1/444* (2013.01)

(58) Field of Classification Search
None
See application file for complete search history.

(56) References Cited

U.S. PATENT DOCUMENTS 5,509,074 A 4/1996 Choudhury et al.
2005/0198330 A1* 9/2005 Kawabata ........... G06F 21/6236
709/229
(Continued)

FOREIGN PATENT DOCUMENTS

JP H07-239828 A 9/1995
JP 2002-176419 A 6/2002
(Continued)

OTHER PUBLICATIONS

Aug. 25, 2020 Office Action issued in Japanese Patent Application No. 2019-123069.
(Continued)

*Primary Examiner* — Thomas D Lee
(74) *Attorney, Agent, or Firm* — Oliff PLC

(57) ABSTRACT

An information processing apparatus includes: a designation unit that allows a user of a transmission source of a document to designate a transmission destination user and a transmission destination terminal; and a transmission unit that transmits the document and transmission destination information indicative of the transmission destination user and the transmission destination terminal designated with the designation unit to an apparatus that transmits the document to the transmission destination terminal.

15 Claims, 21 Drawing Sheets

(56) References Cited

U.S. PATENT DOCUMENTS

| | | | | |
|---|---|---|---|---|
| 2005/0243364 A1* | 11/2005 | Sakai | ............... | H04L 9/3234 |
| | | | | 358/1.15 |
| 2009/0100071 A1* | 4/2009 | Kobayashi | ......... | H04N 1/32096 |
| 2011/0235097 A1* | 9/2011 | Iwasawa | ............... | G06F 21/608 |
| | | | | 358/1.15 |
| 2012/0203670 A1 | 8/2012 | Piersol | | |
| 2014/0337939 A1 | 11/2014 | Nomura | | |
| 2015/0304393 A1* | 10/2015 | Kuraki | ............... | H04L 67/06 |
| | | | | 709/217 |
| 2016/0337499 A1 | 11/2016 | Sugaya | | |

FOREIGN PATENT DOCUMENTS

| | | |
|---|---|---|
| JP | 2003-067309 A | 3/2003 |
| JP | 2003-122660 A | 4/2003 |
| JP | 2003-256597 A | 9/2003 |
| JP | 2004-303108 A | 10/2004 |
| JP | 2008-077530 A | 4/2008 |
| JP | 2008-123070 A | 5/2008 |
| JP | 2008-226081 A | 9/2008 |
| JP | 2008-299395 A | 12/2008 |
| JP | 2010-231697 A | 10/2010 |
| JP | 2010-237726 A | 10/2010 |
| JP | 2010-237728 A | 10/2010 |
| JP | 2011-257983 A | 12/2011 |
| JP | 2013-242705 A | 12/2013 |
| JP | 2014-510318 A | 4/2014 |
| JP | 2015-049573 A | 3/2015 |
| JP | 2016-143214 A | 8/2016 |
| JP | 2016-213751 A | 12/2016 |

OTHER PUBLICATIONS

Sep. 18, 2018 Written Opinion of the International Searching Authority issued in International Patent Application No. PCT/JP2018/024704.

Sep. 18, 2018 Search Report issued in International Patent Application No. PCT/JP2018/024704.

May 7, 2019 Office Action issued in Japanese Patent Application No. 2017-180213.

\* cited by examiner

FIG. 9

EDOC DISTRIBUTION — 400

DISTRIBUTION DESTINATION USER — 402

User0001 ˅

User0001
User0003

[ADD] [DELETE] — 404

DISTRIBUTION DESTINATION TERMINAL — 406

Viewer0001 ˅

Viewer0001
Viewer0004

[ADD] [DELETE] — 408

ACCESS AUTHORITY — 410
- ☐ READING
- ☐ PROCESSING
- ☐ PRINT
- ☐ COPY

OFFLINE EFFECTIVE TERM
30 MINUTES ˅ — 412

[OPTION SETTING] — 414    [OK]   [CANCEL]

|  | COINCIDENCE | SPECIAL SETTING |
|---|---|---|
| A (ACROSS-THE-BOARD) | ++ | ++ |
| D (BUSINESS) | ++ | ++ |
| D1 (TOKYO BUSINESS OFFICE) | +++ | ++ |
| SPECIAL AUDIT PROJECT G-Y-X-1 | + | - |

INFORMATION PROCESSING APPARATUS, PROTECTION PROCESSING APPARATUS AND TERMINAL DEVICE FOR LIMITING ACCESS TO A DOCUMENT

CROSS REFERENCE TO RELATED APPLICATION

This is a continuation of International Application No. PCT/JP2018/024704 filed on Jun. 28, 2018, and claims priority from Japanese Patent Application No. 2017-180213 filed on Sep. 20, 2017.

BACKGROUND

Technical Field

The present invention relates to an information processing apparatus, a protection processing apparatus and a terminal device.

Related Art

A system disclosed in JP-A-H07-239828 is configured to receive requests for a document together with inherent user identification information from a plurality of users having a computer including a display device or a printer. The system is configured to authenticate the requests received from the plurality of users in a copyright server. Then, the copyright server is configured to instruct a document server to correctly authenticate each request. In response to this instruction, the document server is configured to prepare a uniquely encoded, compressed and encrypted document with respect to each authenticated request and to transfer the document for each user of the authenticated request to the corresponding display or printing agent of each user of the authenticated request via a network. The document is uniquely encoded in correspondence to each of the plurality of users. Finally, the system is configured to decrypt and decompress the document at each agent, and to enable the document to be used, in response to only a correct secret key provided to the agent by the user of the authenticated request.

SUMMARY

There are many systems that allows a user designates a document and a user of a transmission destination of the document and registers the document in an account of the user of the transmission destination for permitting the user of the transmission destination to use the document.

However, considering management of a document such as an in-house document required to have confidentiality, the configuration of simply designating the user of the transmission destination of the document may not provide sufficient leakage countermeasures. For example, when the user of the transmission destination uses the document by a terminal for which the complete security management has not been made, a possibility that the document will be leaked from the terminal increases.

Aspect of non-limiting embodiments of the present disclosure relates to reducing a leakage possibility of a document, as compared to a method in which any user designated as a transmission destination of the document may use the document with any terminal device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a designation unit that allows a user of a transmission source of a document to designate a transmission destination user and a transmission destination terminal; and a transmission unit that transmits the document and transmission destination information indicative of the transmission destination user and the transmission destination terminal designated with the designation unit to an apparatus that transmits the document to the transmission destination terminal.

BRIEF DESCRIPTION OF THE DRAWINGS

Exemplary embodiment(s) of the present invention will be described in detail based on the following figures, wherein:

FIG. 9 depicts an example of an input screen of attribute data;

DETAILED DESCRIPTION

Figure 1:
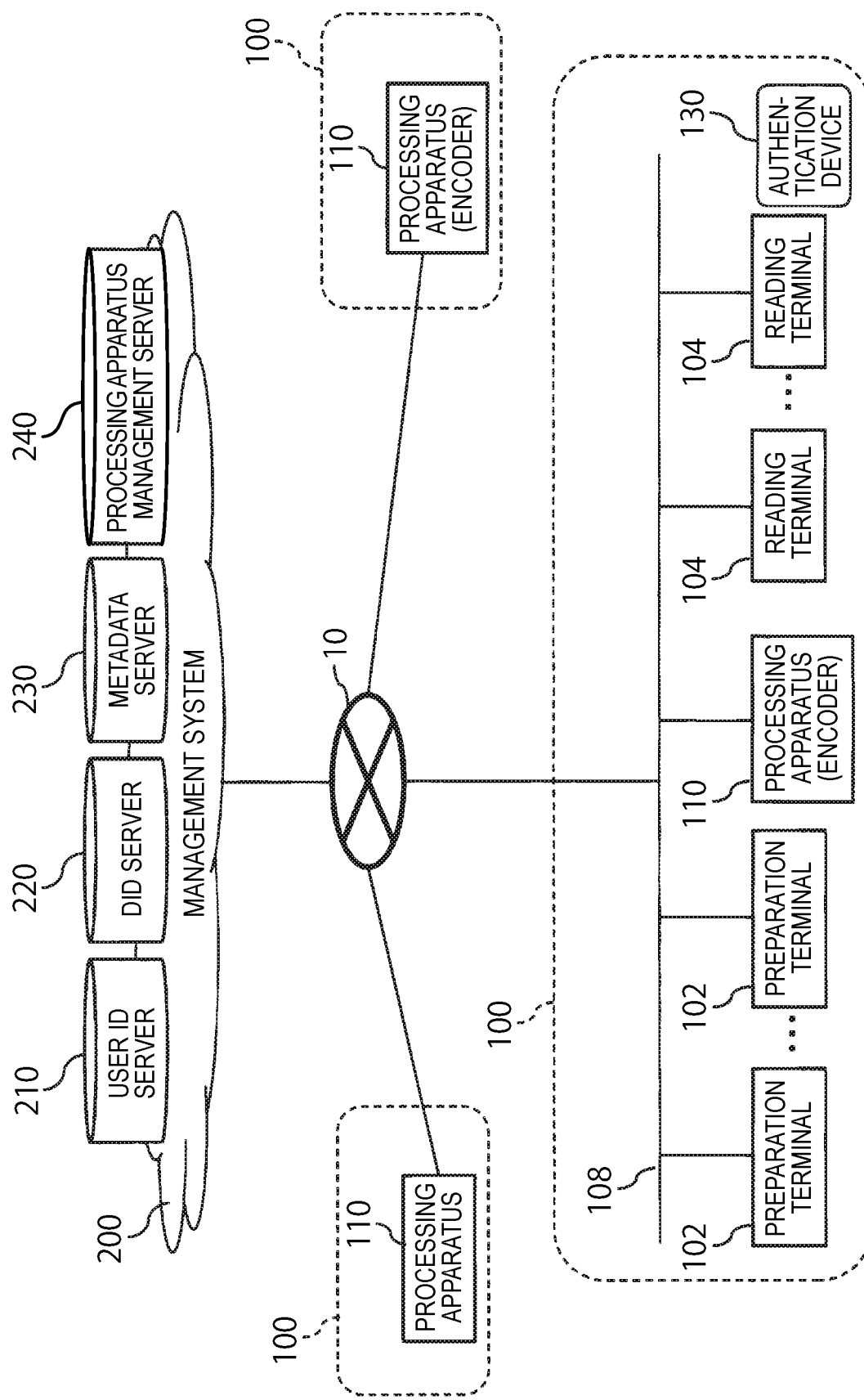
FIG. 1 depicts an example of a configuration of a document management system.

FIG. 1 depicts a schematic configuration of one exemplary illustrative embodiment of a document management system.

In the case of a paper document, a person who holds the document may freely copy the document or hand over the same to another person. Also, the person having obtained the document may read the document. That is, the paper document has a high risk that the information will be leaked.

Regarding this, a document management system of the exemplary embodiment is to provide an environment in which an electronic document may be securely used, and to reduce a risk that the information of the document will be leaked. Here, the document is content data that may be distributed in one unit (for example, one file), and a type of the data is not particularly limited. For example, the concept of the document includes text data, document data prepared by word processor software, spreadsheet data prepared by spreadsheet software, CAD (Computer Aided Design) data, image data, moving picture data, voice data, multimedia data, page data displayed on a web browser, data that has been prepared, edited, or read on a computer and to be printed out, and the like.

The document management system includes a plurality of local systems 100 and a management system 200 configured to manage the local systems (particularly, to manage a processing system to be described later). The management system 200 may perform communication with each local system 100 via a wide area network 10 such as the Internet.

The local system 100 includes one or more preparation terminals 102, one or more reading terminals 104 and a processing apparatus 110, which are connected to the local network 108. The local network 108 is a private network (for example, configured as a LAN (Local Area Network)) provided in an organization such as a company, and is protected from the wide area network 10 by a firewall and the like. Basically, one processing apparatus 110 is provided in the local system 100. When the in-organization private network has a large scale, each network segment configuring the private network may be configured as the local system 100, and the processing apparatus 110 may be one by one provided in each local system 100. For example, a network segment in a living room of each department of a company becomes the local system 100 of the department, and one processing apparatus 110 is provided in the network segment. In this example, the local system 100 in which the processing apparatus 110 is a core is provided in each company or in each department of the company, and the respective processing apparatuses 110 are managed from the central management system 200.

The preparation terminal 102 is a terminal that is to be used when preparing a document, and includes a desktop-type or notebook-type personal computer, a workstation, a tablet terminal, a smartphone, a complex machine, a scanner, a facsimile apparatus, a digital camera and the like, for example. In the preparation terminal 102, an application for preparing, editing and the like a document is installed. Also, in the preparation terminal 102, software for requesting the document management system to distribute the prepared document is installed. The software may be mounted as a device driver configured to transmit and receive information to and from the processing apparatus 110, which will be described later, or may be mounted by a Web application, for example.

The processing apparatus 110 is configured to execute protection processing of converting the document prepared by the preparation terminal 102 into a protected document (hereinafter, referred to as "eDoc file"), which is to be used in a secure environment that is provided by the document management system of the exemplary embodiment. The protection processing is processing of encoding an original document into an eDoc. Seen in this light, the processing apparatus 110 is a kind of an encoder. In the protection processing, the document is converted into data of a dedicated format designed for the system of the exemplary embodiment and is encrypted into a format that may be decrypted by a user designated as a distribution destination of the document, for example. Any of the format conversion and the encryption may be first performed.

Also, the processing apparatus 110 is configured to prepare metadata of the protected document, and to register the prepared metadata in the management system 200, which is a higher-level system. The metadata includes bibliographic items of the protected document, information of distribution destinations, key information that is to be used when each distribution destination decrypts the protected document, and the like. The metadata includes a plurality of items, and data assignment, editing, and updating are executed from a corresponding device or user, in accordance with a function to be provided by the service.

For example, a part of the plurality of items of the metadata is designated by a user who has issued an instruction to register a document in the document management system, and a part of the other items is prepared by the processing apparatus 110. Also, values of some items of the metadata may be set by the management system 200 or the reading terminal 104. Also, the processing apparatus 110 is configured to transmit the generated protected document (eDoc file) to the user's reading terminal 104 of the designated distribution destination.

The protected document, i.e., the eDoc file is a document obtained by converting an original document into a dedicated format and encrypting the same, and is also referred to as a main of the eDoc. In order to make the eDoc file readable, the corresponding metadata is required. The eDoc file and the metadata are prepared, so that a complete readable protected document is configured. A set of the eDoc file and the metadata corresponding thereto is hereinafter referred to as "eDoc".

The processing apparatus 110 may have a function of an access point of a wireless LAN. In this case, the reading terminal 104 may perform communication with the processing apparatus 110 with the wireless LAN.

The reading terminal 104 is a terminal that is to be used for reading of the protected document (eDoc file). The "reading" means using the protected document in a manner corresponding to information content expressed by the document. For example, when the protected document has a document such as word processor data and drawing, as the information content, the "reading" means that the user reads or sees the document displayed by the reading terminal 104. Also, when the information content expressed by the protected document is voice, the "reading" means that the user listens to the voice reproduced by the reading terminal 104. The reading terminal 104 is configured by installing a viewer application for reading the protected document in a general-purpose computer such as a desktop-type or notebook-type personal computer, a workstation, a tablet terminal, a smartphone and the like. Also, a reading-dedicated terminal such as an electronic document terminal provided with a function equivalent to the viewer application may be used as the reading terminal 104. The viewer application has a function of decrypting the encrypted protected document by using the information of the metadata, and a function of decoding data expressed by the dedicated format of the protected document into readable data. In the meantime, a computer that does not have the viewer application corresponding to the document management system of the exemplary embodiment cannot decode the data of the dedicated format into the readable data.

The reading terminal 104 may have a function of receiving processing (editing) on the displayed document from the user, in addition to the functions of decrypting, decoding and displaying the protected document. The processed document has a content different from the original protected document. However, the edited document may be transmitted from the reading terminal 104 to the processing apparatus 110 and registered in the document management system (i.e., encoded into the protected document). Like this, one terminal may have both functions of the preparation terminal 102 and the reading terminal 104. In the meantime, the eDoc is set with an authority (access authority information in the metadata, which will be described later) assigned to a reader, and a content of the authority may include writing limitation to the eDoc, limitation on a redistribution destination, and the like. In the case of the eDoc for which the limitations are defined in the access authority information, the reading terminal 104 is configured to receive a processing (editing) operation from the reader only within a range of the writing limitation, and to receive a designation of a redistribution destination of a new eDoc after the processing only within a range of the limitation on the redistribution destination.

Also, in the exemplary embodiment, an authentication device 130 that is carried by the user is used as a tool for authenticating the user who uses the document management system of the exemplary embodiment, for example. The authentication device 130 is a device such as an IC card, which has therein identification information inherent to the user carrying the device and is configured to execute data processing for user authentication, in response to a request from an external apparatus. The authentication device 130 may be a portable terminal such as a smart phone having a function equivalent to an IC card for personal authentication. The reading terminal 104 and the preparation terminal 102 have a function of performing communication with the authentication device 130 by using a wireless communication protocol such as NFC (Near Field Communication). The reading terminal 104 and the preparation terminal 102 are configured to transmit and receive information for user authentication to and from the authentication device 130 in accordance with a predetermined protocol, thereby authenticating the user who carries the authentication device 130. Alternatively, the actual user authentication may be executed by a server-side of the document management system of the exemplary embodiment, such as the processing apparatus 110 and the management system 200, and the reading terminal 104 and the preparation terminal 102 may be configured to relay the data transfer between the server-side and the authentication device 130. Also, the reading terminal 104 and the preparation terminal 102 may have therein the function of the authentication device 130.

The management system 200 is configured to manage the processing apparatus 110 in each local system 100. Also, the management system 200 is configured to manage the metadata of the protected document generated by each processing apparatus 110, and to provide the metadata to the reading terminal 104, in response to a request. The management system 200 is configured by one computer or a plurality of computers capable of performing communication with each other, and has functions of a user ID server 210, a DID server 220, a metadata server 230, and a processing apparatus management server 240.

The user ID server 210 is a server configured to manage information of each user who uses the document management system. The user who uses the document management system includes two hierarchies. One is a contractor who has made a contract with an administrator of the system for using the document management system. The other is a general user who actually registers or reads a document by using the system under the contract. For example, in many cases, it may be assumed that a company is the contractor, the processing apparatus 110 is equipped in the local network 108 of the company, and an employee of the company uses the document management system with the processing apparatus 110, as the general user. The user ID server 210 is configured to hold and manage the information about the contractor and each of the general users.

The DID server 220 is configured to manage a DID (document ID), which is identification information (ID) of the protected document. Actually, it is the processing apparatus 110 having prepared the protected document that assigns a DID to the protected document. The DID server 220 is configured to assign an issuance authority and an issuance limit (number of issuances) of the DID to the processing apparatus 110, and to receive and record a report of the DID actually issued by the processing apparatus 110 within the issuance authority and the issuance limit. Thereby, the DID server 220 may suppress occurrence of an improper DID and detect a document having an improper DID.

The metadata server 230 is configured to hold and manage the metadata of the protected document (eDoc file) generated by the processing apparatus 110. In the case that a request for the metadata of the protected document is received from the user via the reading terminal 104, when the user is a proper person, the metadata server 230 provides the metadata to the reading terminal 104. In the meantime, the description "the user (reader) who requests the metadata is a "proper person" in the metadata server 230" means that a combination of the user and the reading terminal 104 with which the user issued the request corresponds to a combination of a distribution destination user and the reading terminal 104 of a distribution destination indicated by distribution destination information (which will be described later) in the metadata, which is held in the metadata server 230 in association with the DID (included in the request) of the eDoc file.

The processing apparatus management server 240 is a server configured to manage a status of each processing apparatus 110.

Figure 2:
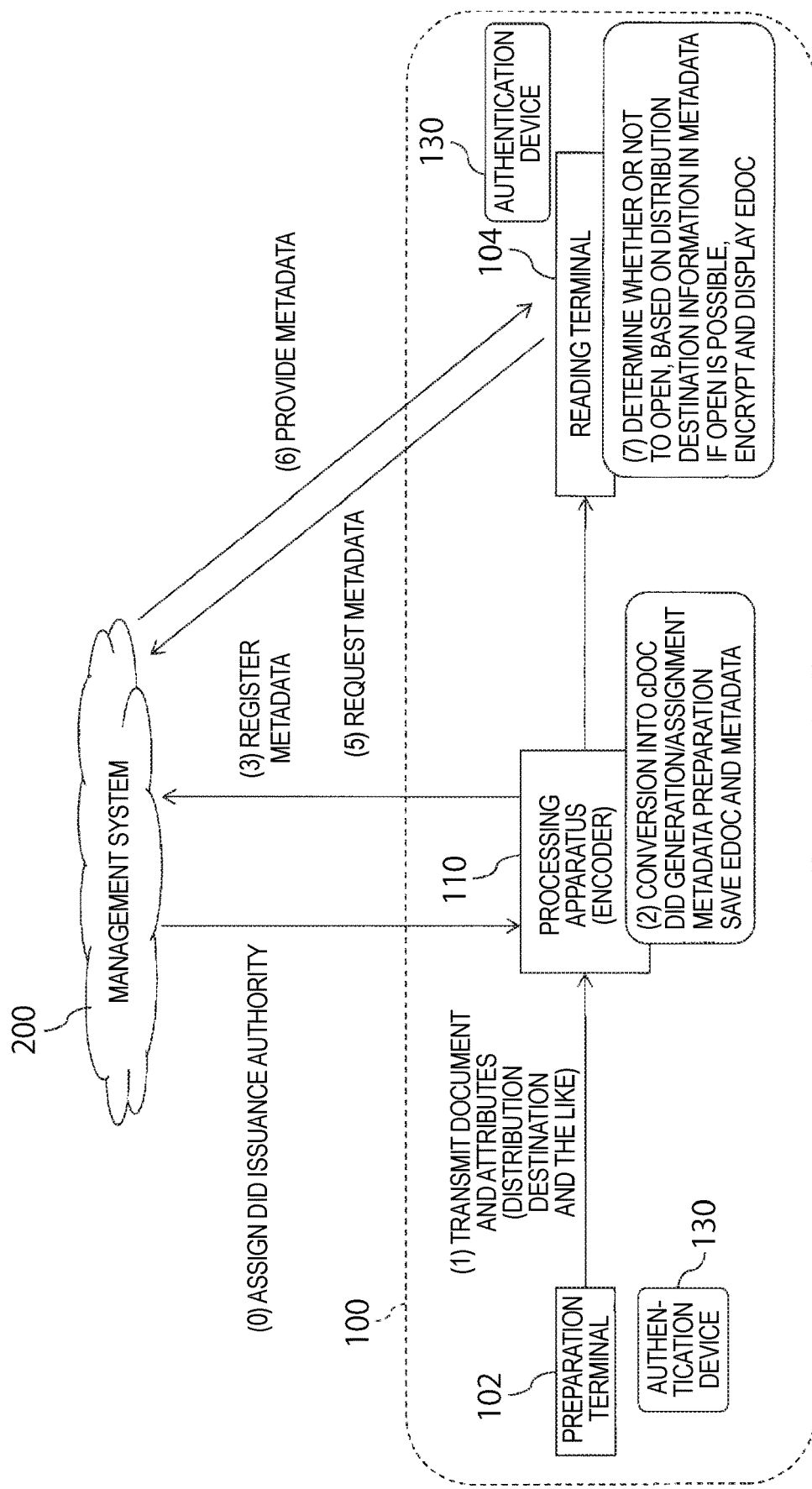
FIG. 2 depicts an outline of document distribution and reading by using the document management system.

A structure of the exemplary embodiment is schematically described with reference to FIG. 2.

(0) The management system 200 (the DID server 220) assigns in advance the issuance authority and issuance limit (number of documents) associated with the issuance authority of the DID (document ID) to the processing apparatus 110 in the local system 100. The issuance authority of the DID is not unlimited but is limited to the issuance limit assigned from the management system 200. That is, the processing apparatus 110 may assign the DID based on the issuance authority assigned at the same time with the issuance limit inasmuch as the number of documents is up to the number indicated by the issuance limit assigned from the management system 200. When the issuance limit is completely consumed, the processing apparatus 110 is assigned with new issuance authority and issuance limit from the management system 200.

(1) When the user intends to register (i.e., to distribute) a document in the document management system of the exemplary embodiment, the user instructs the preparation terminal 102 to register the document. The user instructs "register" on a menu of an application, for example. The preparation terminal 102 having received the instruction requests the user authentication. This authentication may be performed by an input of a user ID and a password or may be performed by the user bringing the authentication device 130 close to a card reader unit of the preparation terminal 102. The user authentication may be performed by the preparation terminal 102 or may be performed by the processing apparatus 110 that is a registration destination of the document. Then, the user selects a document, which is to be registered in the document management system, from the documents held in the preparation terminal 102, and instructs the registration thereof.

When the preparation terminal 102 (more specifically, a program for registration processing installed in the preparation terminal 102) receives the registration instruction of the document from the user, the preparation terminal receives an input of an item (for example, a distribution destination of the document), which is to be designated by the user, of attribute data relating to the document. Here, as the distribution destination, a designation of a combination of the user and the reading terminal 104 may be received. In this case, when the combination of the user and the reading terminal 104 that is to be used for reading of the document by the user coincides with the combination designated as the distribution destination, the user may read the document.

The preparation terminal 102 transmits, to the processing apparatus 110, attribute data in which the attribute item such as the distribution destination input by the user and the other attribute items (for example, information of a registrant, preparation date and time, and the like) generated by the preparation terminal 102 are combined, together with data of the document. In the meantime, the preparation terminal 102 may include a driver configured to convert documents of diverse formats prepared by a variety of applications into a unified format that may be handled by the reading terminal 104. For example, in the case of data indicative of a static document image such as word processor data, spreadsheet and CAD data, the driver converts data thereof into a document expressed by a page description language, such as a printer driver. Also, for example, when the original data is voice data, the driver converts the voice data into data (document) of a specific voice data format corresponding to the document management system (particularly, the reading terminal 104) of the exemplary embodiment.

(2) The processing apparatus 110 implements the protection processing for the document, which is a registration target, received from the preparation terminal 102, thereby generating the protected document (eDoc file). The processing apparatus 110 encodes the received document into a dedicated format of the document management system of the exemplary embodiment, and encrypts the encoded data by using the generated encryption key, thereby generating an eDoc file. The sequence of the encoding and encryption may be reversed. Also, the processing apparatus 110 assigns a unique DID to the eDoc. This DID includes information (an issuance authority key, which will be described later) for verifying that the DID is based on the issuance authority assigned from the management system 200, and information (an issuance certification key, which will be described later) for verifying that the DID has been assigned by the processing apparatus 110. In the meantime, a detailed example of the DID data structure will be described later. The generated DID is incorporated into the eDoc file (for example, as one item of properties of the file).

Also, the processing apparatus 110 generates metadata corresponding to the generated eDoc file. This metadata includes the attribute data, which has been received together with the document from the preparation terminal 102, and values of the attribute items (for example, the DID, an ID of the processing apparatus, encode date and time, encryption key information and the like) generated by the processing apparatus 110. The encryption key information included in the metadata is information indicative of a key for decrypting the eDoc file. When a common key method is used for encryption, the encryption key information is information indicative of the common key. In the meantime, when the common key is included in a plain text format in the metadata, the common key may be misused by wiretapping and interception. Therefore, a key obtained by encrypting the common key with a public key of the distribution destination user is incorporated into the metadata, as the encryption key information.

Also, the processing apparatus 110 saves the generated eDoc file and metadata in a database embedded therein.

(3) The processing apparatus 110 transmits and registers the generated metadata in the management system 200. The management system 200 (the metadata server 230) saves the received metadata.

(4) The processing apparatus 110 distributes the generated eDoc file to the reading terminal 104 designated as the distribution destination. This distribution may be a push type, a pull type or both the types. For example, the processing apparatus 110 may perform the distribution to the reading terminal 104 in the pull type manner upon the preparation of the eDoc, and the reading terminal 104, which has not operated at that time and thus has not received the eDoc file, may receive the eDoc file in the pull type manner. This distribution is performed via the local network 108 in the local system 100.

(5) The eDoc file received by the reading terminal 104 cannot be read, as it is, because it is protected by the encryption or the like. When the user intends to read the eDoc file with the reading terminal 104, the user brings the authentication device 130 close to the card reader unit of the reading terminal 104 for user authentication and then instructs the reading of the eDoc on a screen of the reading terminal 104. The reading terminal 104 having received the instruction accesses the management system 200 to request the metadata of the eDoc. This request includes the DID of the eDoc.

(6) The management system 200 (the metadata server 230) transmits the latest metadata of the eDoc, which has been requested from the reading terminal 104, to the reading terminal 104.

(7) When the reading terminal 104 receives the requested metadata from the management system 200, the reading terminal determines whether the combination of the reading terminal 104 and the user (authenticated with the authentication device 130) who currently uses the reading terminal 104 is included in the distribution destination information included in the metadata. When the combination is not included, the reading terminal 104 does not open the eDoc file and displays an error message, which indicates that the user does not have the reading authority, because the user does not have the authority to read the eDoc with the reading terminal 104. When the combination is included, the user has the authority to read the eDoc file with the reading terminal 104. In this case, the reading terminal 104 decrypts the eDoc file by using the encryption key information included in the metadata and displays the same on the screen. That is, the reading terminal 104 outputs in a manner corresponding to the information content of the eDoc file.

In the metadata, an effective term may be set. The effective term is calculated by adding a prescribed effective term or an effective term designated by a distributor or the like to data and time at which the metadata has been transmitted, for example. After the effective term of the metadata, the reading terminal 104 cannot open (decrypt and display) the corresponding eDoc file until the metadata is again acquired from the management system 200. When the reading terminal 104 may perform communication with the processing apparatus 110 or the management system 200, the reading terminal acquires the metadata, which is latest upon the instruction of the eDoc file instructed as a reading target, from the processing apparatus 110 or the management system 200, and determines whether or not to read the eDoc on the basis of the latest metadata.

After the metadata is first registered in the management system 200, the distribution destination information or access authority information included in the metadata may be changed by the distributor or a person (for example, a person who holds a data editing authority) to which an authority to change the distribution destination is assigned. If even the user designated as the distribution destination upon the preparation and registration of the eDoc is excluded from the distribution destination by a change thereafter, the reading terminal 104 detects the same by the distribution destination information included in the latest metadata acquired from the management system 200 and does not display the eDoc file.

Subsequently, an example of the data content of the metadata 300 of the eDoc is described with reference to FIG. 3.

"DID" of the items included in the metadata 300 is a document ID assigned by the processing apparatus 110 having generated the eDoc. "Document name" is a name or title of the eDoc.

"Distributor ID" is a user ID of the person who has distributed the eDoc, i.e., the person (hereinafter, referred to as 'distributor') who performs the registration operation of the document for the processing apparatus 110 from the preparation terminal 102 and performs the distribution via the processing apparatus 110.

"Encode date and time" is date and time at which the document from the preparation terminal 102 has been encoded (protection processing) and the eDoc thereof has been prepared. "Processing apparatus ID" is identification information of a processing apparatus having executed the protection processing. "Encryption information" is information about encryption upon the generation of the eDoc, and includes an encryption software name used for encryption, a version of the encryption software, and key information indicative of a key for decryption. The key information is obtained by encrypting a key for decryption with a public key of each distribution destination user, for example. "Keyword information" is a list of keywords extracted from the eDoc (or the original data). The keyword information is used when retrieving the eDoc, for example.

"Distribution destination information" is information indicative of the user and reading terminal designated as the distribution destination of the eDoc by the distributor. In the example of FIG. 3, the distribution destination information includes the user ID of the user and the ID (identification information) of the reading terminal 104, which is to be used for reading by the user, for each user of the distribution destination. When a plurality of the reading terminals 104, which may be used for reading of the eDoc by the user, is designated, a set of the user ID of the user and IDs of the plurality of the reading terminals 104 is incorporated in the distribution destination information.

As another example, in the case that the eDoc may be read even when the distribution destination user uses any of the reading terminals 104 designated as the distribution destination, the distribution destination information includes a list of IDs of the distribution destination users and a list of IDs of the reading terminals 104 of the distribution destination. For example, there is a case where a common terminal of the department, a terminal provided in a living room or conference room of the department, and the like are set as the candidates of the reading terminal 104 of the distribution destination. In the case of the common terminal and the terminal (which is also a kind of the common terminal) provided in the living room and the like, it is not determined which of the users in the organization will use the same. However, the distributor knows at least the type of the terminal and also knows that the corresponding terminal will not be freely taken out of the organization. Therefore, the corresponding terminal is qualified as the distribution destination of the document, which is a confidential target. When using the eDoc with the common terminal of which features are well-known, the distribution destination user may use any of the reading terminals 104 designated as the distribution destination.

"Access authority information" is information indicative of a using authority over the eDoc, which is assigned to the distribution destination user by the distributor.

"Offline effective term" is information indicative of a length of the effective term of the metadata. That is, even though the reading terminal 104 is in a state (offline state) where it cannot access the management system 200, when there is metadata acquired and cached upon previous reading of the eDoc and "offline effective term" has not elapsed from the acquisition date and time of the metadata, the reading terminal 104 decrypts and displays the eDoc by using the encryption key information in the metadata. On the other hand, when the reading terminal is in the offline state and the offline effective term of the cached metadata for the eDoc of which reading has been instructed has already elapsed, the reading terminal 104 does not decrypt and display the eDoc. In the meantime, while the reading terminal 104 may access the management system 200 (i.e., the reading terminal is in an online state), when the user instructs the reading of the eDoc, the reading terminal acquires and uses the latest metadata of the eDoc from the management system 200 (particularly, the metadata server 230).

"Original data information" is information indicating whether the original data before the eDoc is generated (encoded) has been saved, and is information (for example, URL: Uniform Resource Locator) indicating a save place of the original data when the original data has been saved. Here, the original data is a document that has been transmitted from the preparation terminal 102 to the processing apparatus 110 and has not been yet subjected to the protection processing, application data (for example, data of word processor software before conversion into page description language data, when the document is the page description language data), which is a source of the document, or both of them.

"Document acquisition date and time" is date and time at which the reading terminal 104 has acquired a file (i.e., the eDoc file) of the main data of the eDoc. "Metadata acquisition date and time" is date and time at which the reading terminal 104 has acquired the latest metadata, which is currently cached, of the eDoc from the management system 200. The document acquisition date and time and the metadata acquisition date and time are not included in the metadata held in the management system 200, and are added to the metadata, which has been acquired from the management system 200 by the reading terminal 104, for management in the reading terminal.

Figure 3:
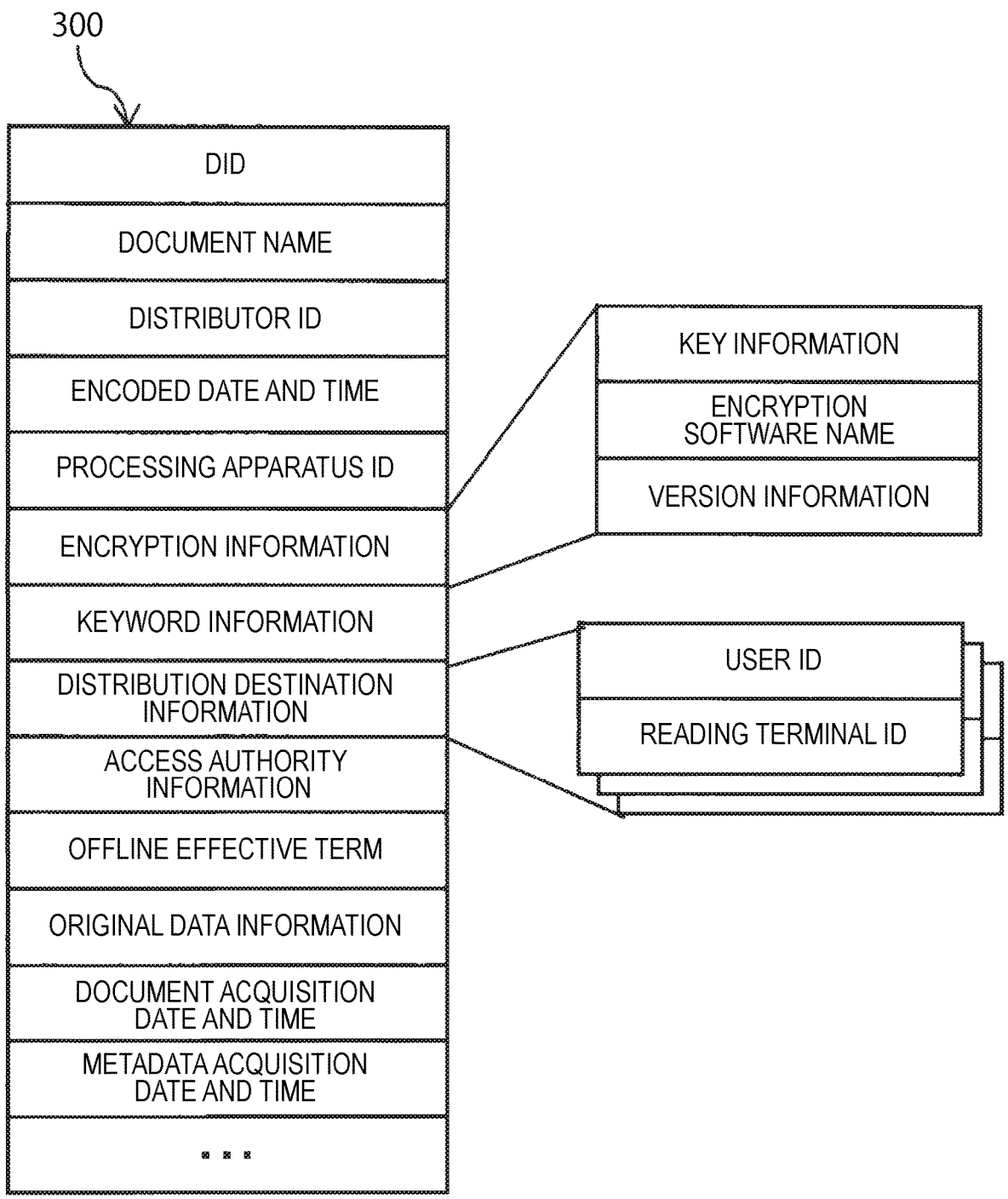
FIG. 3 exemplifies data content of metadata.

Also, the DID, the encode date and time, the processing apparatus ID, the encryption information, and the keyword information of the items of the metadata shown in FIG. 3 are information that is to be generated by the processing apparatus 110. Also, the document name, the distributor ID, the distribution destination information, the access authority information, the offline effective term, and the original data information originate from the document or attribute data that is to be transmitted from the preparation terminal 102 to the processing apparatus 110.

Subsequently, data contents of the information that is to be managed by the respective servers 210 to 250 of the management system 200 are exemplified.

Figure 4:
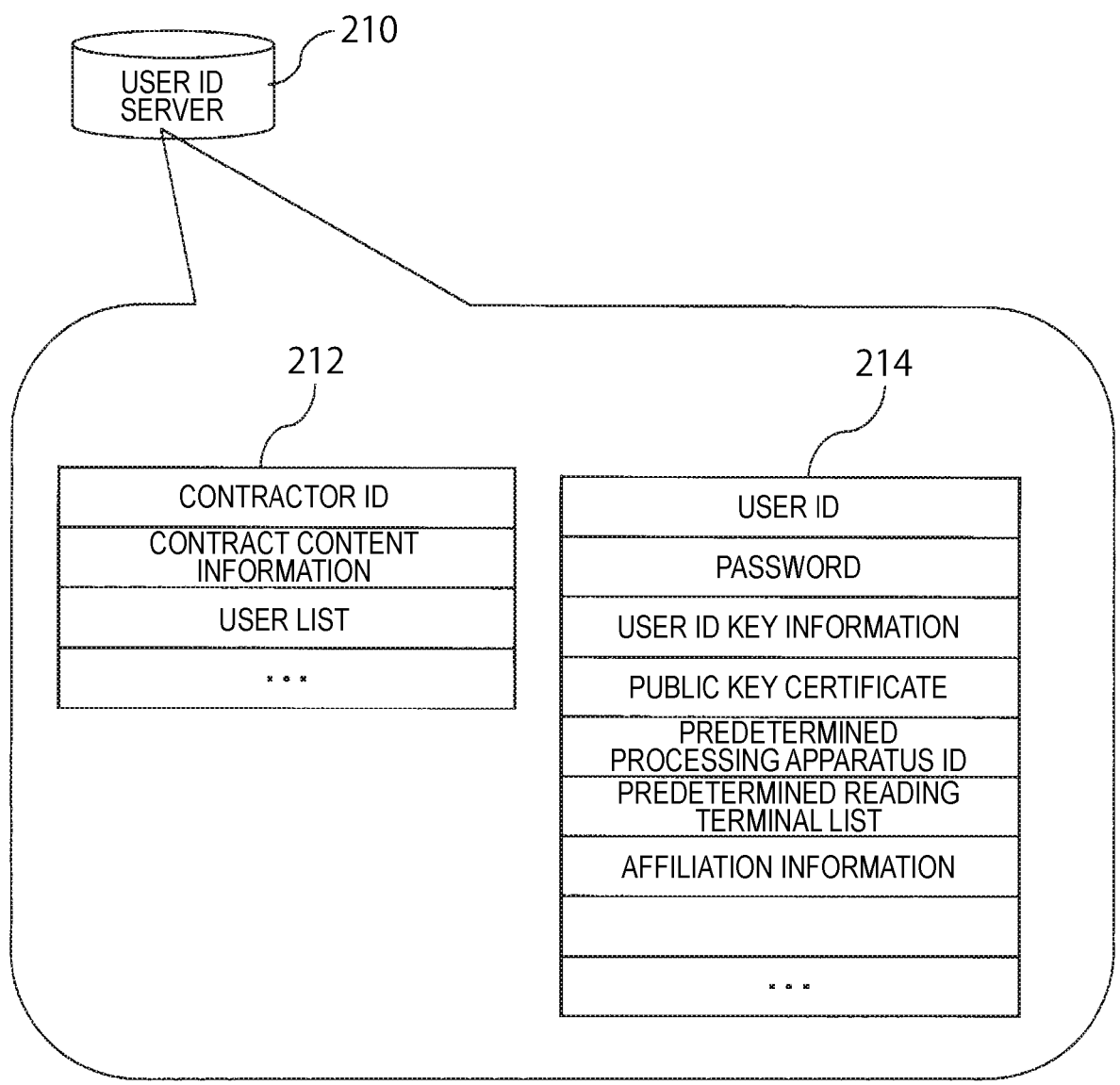
FIG. 4 exemplifies data content that is managed by a user ID server.

First, an example of the data content that is to be managed by the user ID server 210 is described with reference to FIG. 4. In the user ID server 210, contractor data 212 of each contractor and user data 214 of each general user are registered.

The contractor data 212 includes a contractor ID, contract content information, and a user list. The contractor ID is identification information of a contractor (for example, an organization or a department in the organization) having contracted with an administrator of the document management system. The user list is a list of user IDs of general users (for example, members belonging to an organization that is the contractor) who use the document management system by the contract of the contractor.

The general user data 214 includes a user ID of a general user, a password, user ID key information, a public key certificate, a predetermined processing apparatus ID, a predetermined reading terminal list, and affiliation information. The user ID key information is authentication information of the user that is to be used by the authentication device 130 of the user. The public key certificate is a digital certificate for certificating a public key of the user. The predetermined processing apparatus ID is an ID of the processing apparatus 110 for which the user has been registered. Usually, a user is registered in the processing apparatus 110 provided in an office to which the user belongs, and the processing apparatus 110 is a predetermined processing apparatus for the user. The predetermined reading terminal list is a list of IDs of one or more reading terminals that are mainly used by the user. The reading terminals included in the list become candidates of the distribution destination terminal when distributing an eDoc to the user. The affiliation information is information for specifying an organization or department thereof to which the user belongs, and for example, is a contractor ID of the organization or department thereof.

Subsequently, an example of the data content that is to be managed by the DID server 220 is described with reference to FIG. 5.

Figure 5:
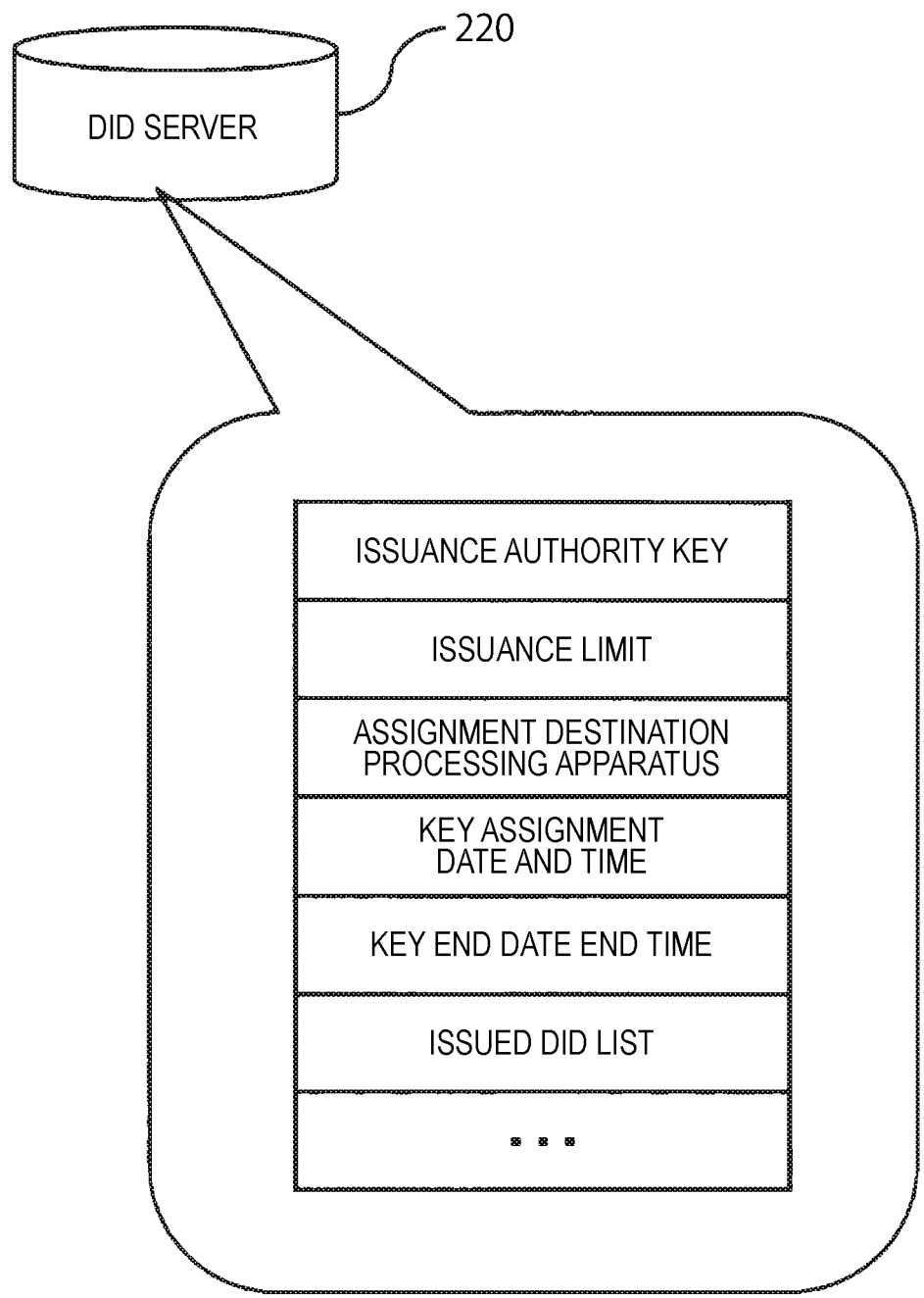
FIG. 5 exemplifies data content that is managed by a DID server.

As shown in FIG. 5, the DID server 220 is configured to hold an issuance limit, an assignment destination processing apparatus, key assignment date and time, key end date and time, and information of each item of an issued DID list, for each issuance authority key issued for the processing apparatus.

The issuance authority key is key information (for example, a randomly generated character string), which is assigned to the processing apparatus 110 by the DID server 220, for verifying an issuance authority of the DID. The processing apparatus 110 includes the issuance authority key, which is assigned from the DID server 220, to a DID, which is to be issued by the processing apparatus, thereby verifying that the DID has been issued under the proper issuance authority.

The issuance limit is an upper limit of DID issuance (the upper limit number of documents to which the DID may be assigned) assigned to the processing apparatus 110, together with the issuance authority key. When the processing apparatus 110 is assigned with the pair of the issuance authority key and the issuance limit from the DID server 220, the processing apparatus may assign an inherent DID to each of eDocs up to the upper limit number indicated by the issuance limit.

The assignment destination processing apparatus indicates an ID of the processing apparatus 110, which is an assignment destination of the issuance authority key (and the issuance limit). The key assignment date and time is date and time at which the issuance authority key has been assigned to the processing apparatus 110. The key end date and time is date and time at which the processing apparatus 110 of the assignment destination has finished the issuance authority key. That is, the key end date and time is date and time at which the processing apparatus 110 has completely assigned the DIDs to all of the upper limit number of eDocs indicated by the issuance limit assigned together with the issuance authority key. In the meantime, when a structure where the processing apparatus 110 having used up the issuance limit requests next issuance authority key and issuance limit from the DID server 220 is adopted, instead of explicitly recording the key end date and time of any issuance authority key (referred to as 'first key'), the key assignment date and time of the issuance authority key, which is assigned to the processing apparatus 110 after the issuance authority key, may be used as the key end date and time of the first key. The issued DID list is a list of a DID, which has been issued using the issuance authority key by the processing apparatus 110 of the assignment destination, and an issuance date thereof. The processing apparatus 110 of the assignment destination is configured to notify a DID to the DID server 220 whenever issuing the DID by using the issuance authority key, and the DID server 220 is configured to add the notified DID and the issuance date thereof to the issued DID list corresponding to the issuance authority key included in the DID.

The metadata server 230 is configured to save the metadata of each eDoc to be transmitted from each processing apparatus 110. The data content of the metadata to be kept is similar to the example of FIG. 3. However, the metadata server 230 does not manage the items (document acquisition date and time, metadata acquisition date and time and the like), which are used only in the reading terminal 104, of the items of the metadata shown in FIG. 3.

Subsequently, data that is to be managed by the processing apparatus management server 240 is described with reference to FIG. 6. The processing apparatus management server 240 is configured to store a status hysteresis 242 of the processing apparatus 110, for each processing apparatus 110, which is a management target. In the status hysteresis, information of a status 244 of the processing apparatus 110 upon preparation and each update (date and time of preparation and update) is included in association with the ID of the processing apparatus 110.

At each point of time, in the status 244, an equipment place, a contractor ID, an administrator name, an administrator contact point, a registered user list, software information 246, hardware information 248, a disk free space, and security certificate information are included. The equipment place is information indicative of an equipment place of the processing apparatus 110, and includes information of an address, a building name, a floor number and the like, for example. The contractor ID is an ID of the contractor who uses the processing apparatus 110. The administrator name is a name of an administrator of the processing apparatus 110. The administrator is a user who manages the processing apparatus 110 in a department of an equipment destination of the processing apparatus 110, for example. The administrator contact point is information (for example, an e-mail address) of a contact point of the administrator. The registered user list is a list of user IDs of users registered in the processing apparatus 110 (in other words, a user of "the predetermined processing apparatus", which is the processing apparatus 110).

The software information 246 includes an encode software name, an encode software version, an encryption software name, an encryption software version, and names and versions of the other software installed in the processing apparatus 110. The encode software is software for converting (encoding) a document input from the preparation terminal 102 into a dedicated format of the document management system. The encryption software is software for encrypting the document (for example, the document converted into the dedicated format).

In the hardware information 248, encode circuit information, an encode circuit FW version, a manufacturer name of the processing apparatus 110, and the like are included. The encode circuit information is information indicative of a type of a hardware circuit that is to be used for encode processing. The encode circuit FW version is a version of firmware (FW) of the encode circuit.

The disk free space is a free space of a secondary storage such as a hard disk, a solid state disk and the like of the processing apparatus 110, at the point of time.

The security certificate information is information (for example, information of a subject identifier of the certificate, an issuer identifier, issuance date and time, and the like) for specifying each security certificate installed in the processing apparatus 110 at the point of time.

Also, although not shown for avoiding complication, in the status 244, types of fonts (a list of fonts) installed in the processing apparatus 110, an address (for example, an IP address) for network communication, device IDs of the mounted secondary storages (the hard disk drive and the like), information indicative of customization content for connecting the processing apparatus 110 to processing of a core system of an organization of an equipment destination, install date and time of an encryption key (a key for communication channel encryption or signature, and the like) that is to be used by the processing apparatus 110, and the like are included.

Figure 7:
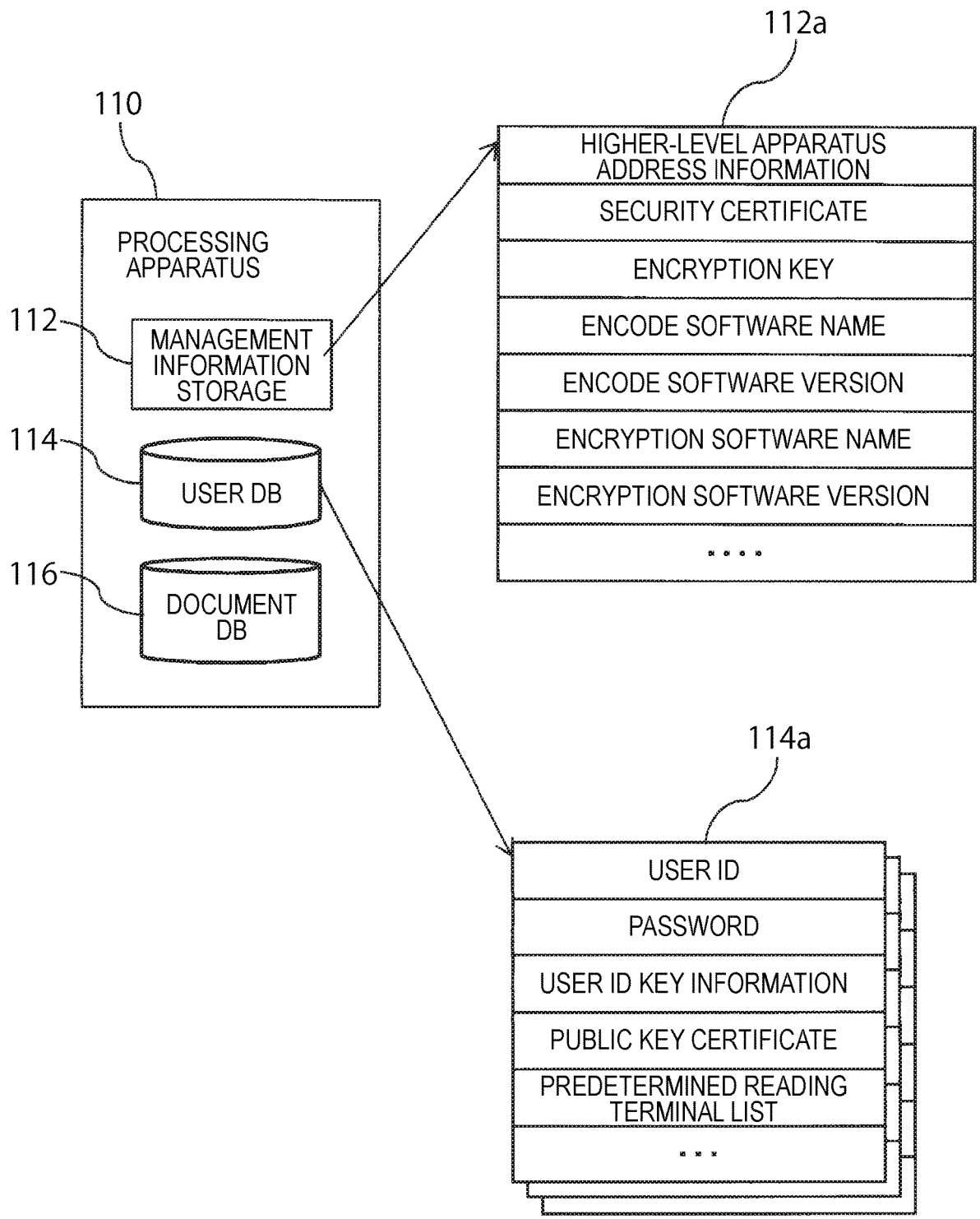
FIG. 7 exemplifies a configuration of a processing apparatus and data content of the processing apparatus.

Subsequently, a database group that is to be held by the processing apparatus 110 is described with reference to FIG. 7. As shown, the processing apparatus 110 includes a management information storage 112, a user DB 114 and a document DB 116.

In the management information storage 112, management information 112a is stored. The management information 112a includes higher-level apparatus address information, a security certificate, an encryption key, an encode software name, an encode software version, an encryption software name, an encryption software version, and the like. The higher-level apparatus address information is information of a communication address (for example, an IP address, a URL and the like) of each higher-level apparatus configured to manage the processing apparatus 110. The management system 200, the respective servers 210 to 240 in the management system, an in-organization management system 150, and respective servers 152 to 156 in the in-organization management system are examples of the higher-level apparatus. The security certificate is a digital certificate that is to be used when the processing apparatus 110 performs secure communication with the other apparatuses on the network on the basis of the public key. The processing apparatus 110 holds the security certificate of each higher-level apparatus, which is a frequent communication partner. Also, the processing apparatus may hold a security certificate of each user who uses the preparation terminal 102 and the reading terminal 104. The encryption key is an encryption key of the processing apparatus 110, which is to be used for encryption and decryption when the processing apparatus 110 perform communication with the other apparatus on the network, for digital signature (or generation of certificate information similar to the digital signature) by the processing apparatus 110 and the like. For example, in a public key infrastructure, a pair of a secret key and a public key assigned to the processing apparatus 110 may be exemplified. The encode software and the decryption software are software for encode (conversion into a dedicated format) and encryption installed in the processing apparatus 110, respectively.

In the user DB 114, user information 114a of each user (in other words, the user of "the predetermined processing apparatus", which is the processing apparatus 110) registered in the processing apparatus 110 is stored. The user information 114a of each registered user includes a user ID, a password, user ID key information, public key information, a predetermined reading terminal list and the like. These items are the same data as the data of the user ID server 210 described with reference to FIG. 4.

In the document DB 116, an eDoc file generated by the processing apparatus 110 and metadata corresponding to the eDoc file are saved. Since the eDoc file and the metadata include the information of the DID, they may be associated with each other. Also, in the document DB 116, the original data (data received from the preparation terminal 102) before it is encoded to the eDoc may be registered in association with the DID of the eDoc.

The preparation terminal 102 and the reading terminal 104 store, for each user who uses the terminals, the authentication information (a user ID, a password and the like) of the user, and ID of a predetermined processing apparatus, address information of the predetermined processing apparatus, address information of a higher-level apparatus (for example, the management system 200 and the in-organization management system 150 to be described later), security certificates of the processing apparatus and the higher-level apparatus, an encryption key to be used for encryption of a communication channel, and the like.

<Processing Flow of System>

When the processing apparatus 110 is equipped on the local network 108, a repair operator who performs maintenance on the processing apparatus 110 registers, in the processing apparatus 110, the information of the users who use the processing apparatus 110, and the information of the preparation terminal 102 and the reading terminal 104, which may be used by the users. The registered information of the users is transferred and registered in the user ID server 210 (or the local user ID server 152 to be described later), which is a higher-level apparatus. In the meantime, after the equipment, when the number of the users who use the processing apparatus 110 increases or decreases, the repair operator performs an operation of newly registering the information of the increased user or deleting the registration of the information of the decreased user, for the processing apparatus 110. The addition or deletion is notified to the higher-level apparatus such as the user ID server 210, too, and the information held by the higher-level apparatus is correspondingly updated. Also, the repair operator installs, in each preparation terminal 102, the software (for example, a device driver of the processing apparatus 110) for performing processing of requesting the processing apparatus 110 to register and distribute a document. Also, the repair operator registers, in each reading terminal 104, the information (for example, an apparatus name, a communication address, a wireless access setting) for performing communication with the processing apparatus 110.

Subsequently, a flow of processing that is to be performed when a document is registered and distributed via the document management system of the exemplary embodiment is described with reference to FIG. 8.

(1)-1: Transmission of Login ID (=User Name) and Password

When the user (distributor) instructs the preparation terminal 102 to register a document, the preparation terminal 102 displays a screen for requesting an input of the login authentication information (for example, the user ID and password or the authentication device 130). When the distributor inputs the authentication information, in response to the request, the preparation terminal 102 transmits the authentication information to the processing apparatus 110 via the local network 108.

(1)-2: User Authentication

The processing apparatus 110 having received the login authentication information performs the user authentication by using the information. Here, it is assumed that the user authentication is successful (the proper user is confirmed). The login authentication may be performed using the login ID and password, and when the preparation terminal 102 is adapted to communication with the authentication device 130, the login authentication may be performed using the authentication device 130.

(2)-1: Transmission of Document (+Original File) and Attribute Data

When the login authentication is successful, the user selects a document, which the user intends to register (and to distribute to the other user) in the document management system, from the documents held in the preparation terminal 102 and instructs the processing apparatus 110 to register the same. Then, the software (for example, a device driver) becoming an interface with the processing apparatus 110 is activated to receive an input of the attribute data relating to the document from the user and to transmit the received attribute data and data of the document to the processing apparatus 110.

FIG. 9 depicts an example of an input screen 400 of the attribute data. The input screen 400 includes a distribution destination user selection menu 402, a distribution destination user list column 404, a distribution destination terminal selection menu 406, a distribution destination terminal list column 408, an access authority setting column 410, an offline effective term menu 412, and an option setting call button 414.

The distribution destination user selection menu 402 is a pull-down menu for enumerating options of distribution destination users of the document. The users becoming the options are the users registered in the processing apparatus 110, and a list of IDs and user names of the users becoming the options may be acquired from the processing apparatus 110. Alternatively, the preparation terminal 102 may acquire the list of users from the local user ID server 152 (refer to FIG. 12) (which will be described later) configured to manage the information of the users of the document management system belonging to the organization, and the distributor may select the user registered in the other processing apparatus 110 in the organization, as the distribution destination. In this case, in the distribution destination user selection menu 402, each user is displayed so that the processing apparatuses 110 in which the users are registered may be distinguished. For example, the users may be displayed with colors or character styles, which are different for each of the processing apparatuses 110 in which the users are registered. Alternatively, the distribution destination user selection menu 402 may be configured as a hierarchy structure, the processing apparatus 110 may be first selected to call the list of users registered in the corresponding processing apparatus 110, and the user of the distribution destination may be selected from the list. In the distribution destination user list column 404, a list of the distribution destination users selected by the user is displayed. When the distributor selects the distribution destination user from the distribution destination user selection menu 402 and pushes the right "add" button, the user ID or user name of the distribution destination user is added to the distribution destination user list column 404. Also, when the distributor selects one distribution destination user from the distribution destination user list column 404 and pushes the right "delete" button, the distribution destination user is deleted from the distribution destination user list column 404. That is, the distribution destination user is not the distribution destination any more.

The distribution destination terminal selection menu 406 is a pull-down menu for enumerating options of the reading terminals (viewers) 104, which are the distribution destination of the document. The reading terminals 104 becoming the options are the reading terminals registered in the processing apparatus 110, and a list of IDs and terminal names of the reading terminals 104 becoming the options may be acquired from the processing apparatus 110. Alternatively, the processing apparatus 110, the local user ID server 152 (refer to FIG. 12) (which will be described later) or the like has a list of the reading terminals 104 in the organization registered in the document management system, and the preparation terminal 102 may present the distributor with the list so that the distributor may select the reading terminal 104 of the user registered in the other processing apparatus 110 in the organization, as the distribution destination. In the distribution destination user list column 404, a list of the reading terminals 104 of the distribution destination selected from the distribution destination terminal selection menu 406 by the distributor is displayed, like the distribution destination user list column 404.

In the meantime, for each user of the distribution destination, the reading terminal 104 of the distribution destination corresponding to the user may be designated. Whenever the user of the distribution destination is selected from the distribution destination user list column 404, for example, the preparation terminal 102 may acquire a list of the predetermined reading terminals of the user from the processing apparatus 110 (or the local user ID server 152 or the user ID server 210), and set the list in the distribution destination terminal selection menu 406. When the distributor does not explicitly select the reading terminal 104 of the distribution destination for the user of the distribution destination, a specific reading terminal (for example, a head of the list) of the list of the predetermined reading terminals of the user is automatically selected as the reading terminal 104 of the distribution destination.

The access authority setting column 410 is a column for setting an access authority (using authority) of the distribution destination user to the document. In the shown example, check boxes about four authority items of reading, processing (editing), print and copy are shown, and the distributor checks the check box of the item to be permitted to the distribution destination user with respect to the document.

The offline effective term menu 412 is a pull-down menu indicative of options of lengths of the offline effective term to be set for the document. The distributor selects a time period to be set for a document to be registered in the system and to be distributed, from the offline effective terms shown in the offline effective term menu 412.

Figure 10:
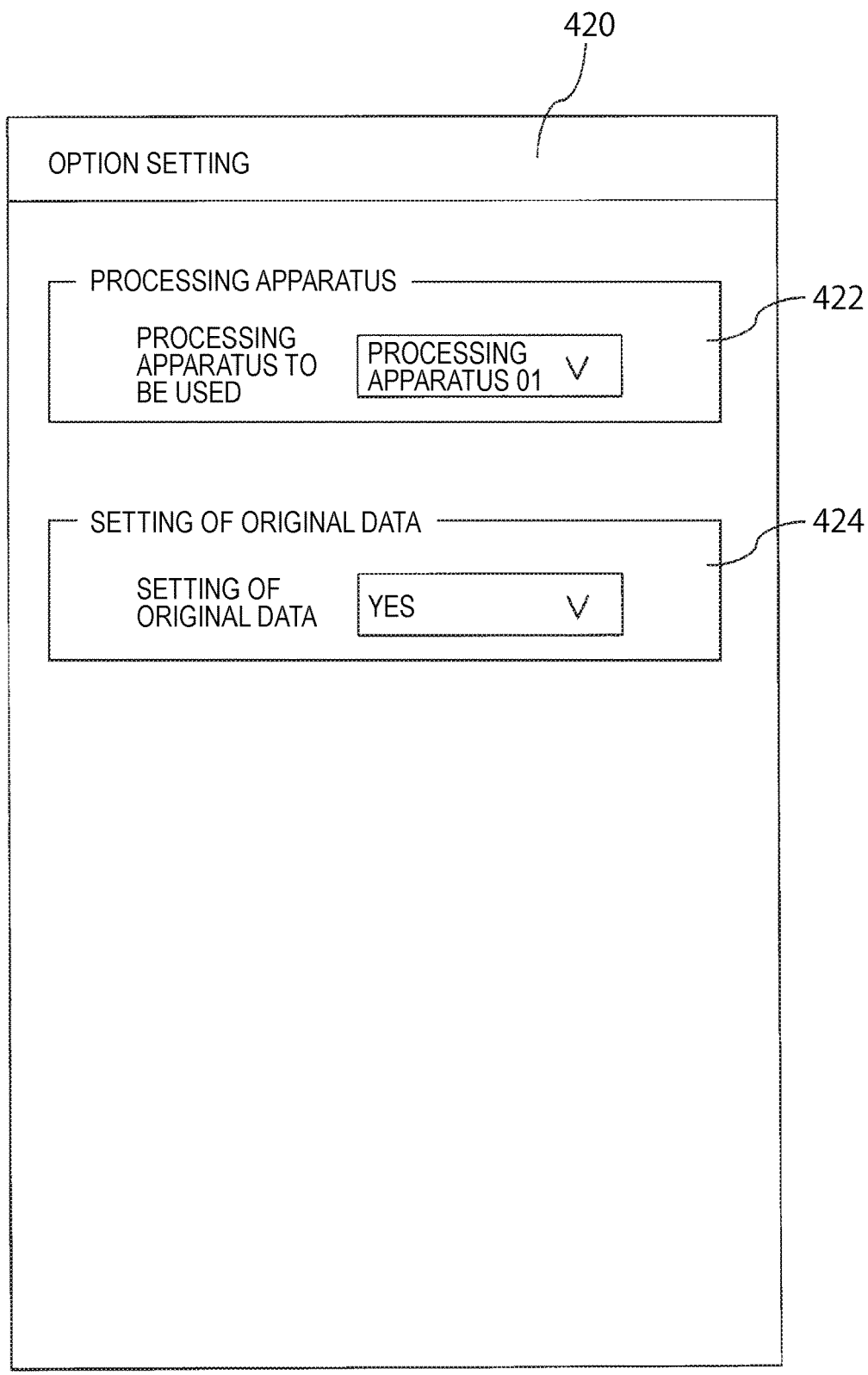
FIG. 10 depicts an example of an option setting screen.

Also, when the option setting call button 414 is pushed, the preparation terminal 102 displays an option setting screen 420 shown in FIG. 10. The option setting screen 420 includes a processing apparatus designation column 422 and an original data setting column 424. The processing apparatus designation column 422 includes a pull-down menu in which options of the processing apparatus 110, which is the distribution destination of the document, are indicated. In this menu, a list of the processing apparatuses 110 that may be selected from the preparation terminal 102 is included. The processing apparatus 110 included in the list is the processing apparatus 110 (basically one but may also be plural) in the local system 100 to which the preparation terminal 102 belongs. Also, the processing apparatus 110 of the other local system 100 in the same organization may be included in the list. In the original data setting column 424, a pull-down menu for receiving a selection as to whether or not to save the original data, which is a source of the eDoc, in the processing apparatus 110.

The attribute data transmitted from the preparation terminal 102 to the processing apparatus 110 in step (2)-1 includes the distribution destination information (the user list and the reading terminal list), the access authority information, the offline effective term, the original data information and the like set by the setting screen.

Figure 8:
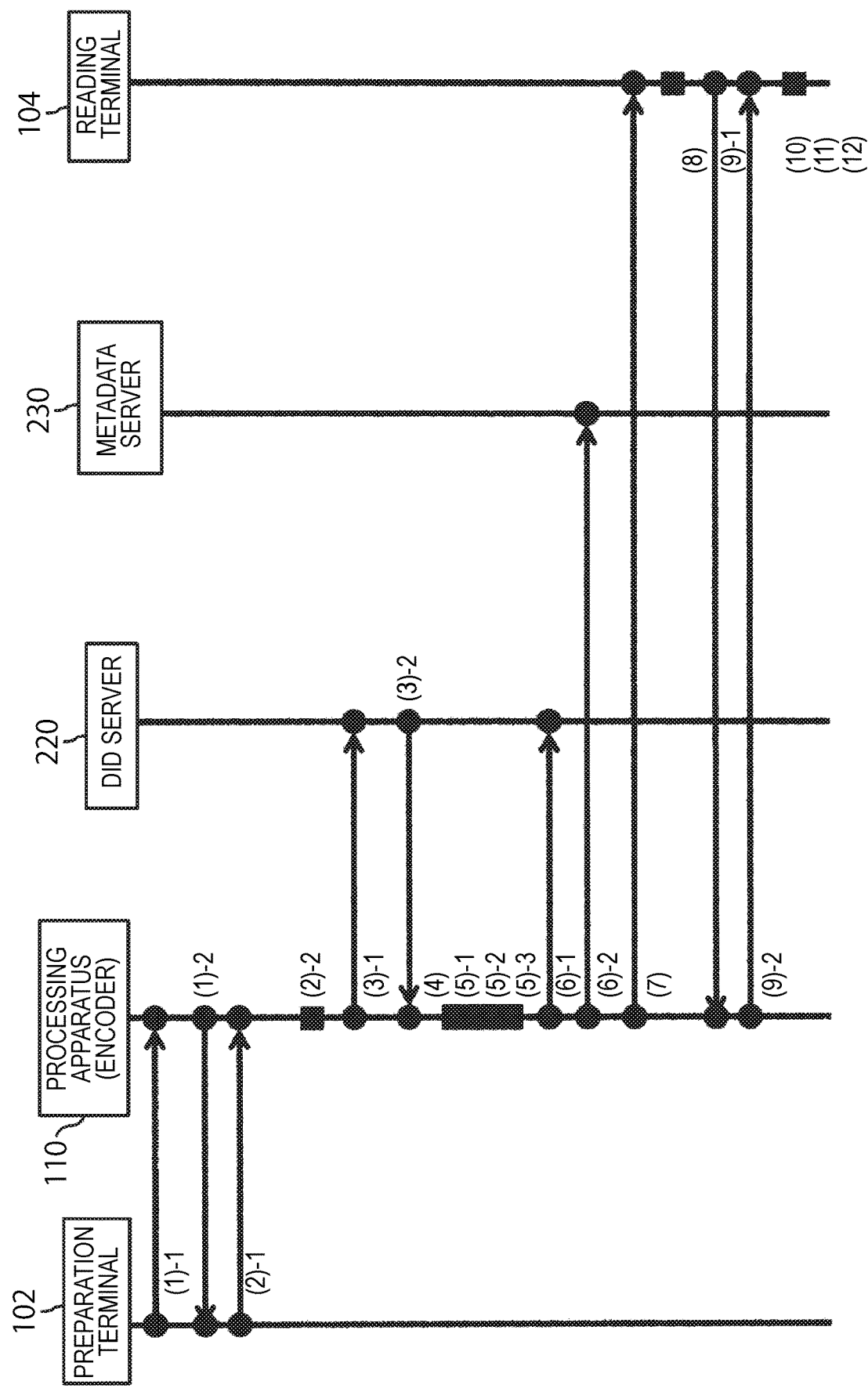
FIG. 8 depicts a flow of the document distribution and reading that is to be executed by the document management system.

The description returns to FIG. 8.

(2)-2: Reception of Document (+Original File) and Attribute Data

The processing apparatus 110 receives the document (referred to as 'target document') and the attribute data from the preparation terminal 102.

(3)-1: Request for DID Issuance Authority and Issuance Limit

When the processing apparatus 110 does not receive the issuance authority and the issuance limit of the DID (or has used up the received issuance limit), the processing apparatus requests new issuance authority and issuance limit from the DID server 220 of the management system 200. On the other hand, when there is a remnant in the received issuance limit, the processing apparatus proceeds to step (4), which will be described later, without the request.

(3)-2: Assignment of DID Issuance Authority and Issuance Limit

The DID server 220 transmits new issuance authority and issuance limit to the processing apparatus 110, in response to the request from the processing apparatus 110.

(4): Generation of DID and Assignment of DID to eDoc File

The processing apparatus 110 issues a DID by using the issuance authority assigned from the DID server 220, and assigns the DID to an eDoc (which is generated in next step) that is to be generated from the target document.

(5)-1: Preparation of eDoc File (Conversion into Unique Format and Generation and Encryption of Encryption Key)

The processing apparatus 110 generates an encryption key for encrypting the target document by using random numbers and the like, for example. Also, the processing apparatus 110 converts the target document into an eDoc file. That is, the processing apparatus 110 encodes the target document into a dedicated format of the document management system and encrypts an encode result with the previously generated encryption key, thereby generating an eDoc file. In the generated eDoc file, the information of the previously generated DID is included.

(5)-2: Preparation of Metadata (Addition of Encryption Key Information and the Like to Attribute Data)

The processing apparatus 110 generates the metadata of the generated eDoc. That is, the processing apparatus 110 adds the previously generated DID, the encode date and time, the ID of the processing apparatus 110, the encryption information and the like to the attribute data received from the preparation terminal 102, thereby generating the metadata (refer to FIG. 3). Here, in the encryption information, for each distribution destination user, the key information in which the encryption key used for encryption is encrypted with the public key of the distribution destination user is included.

(5)-3: Save of Original Data

When an instruction to save the original data is received from the preparation terminal 102, the processing apparatus 110 saves the document (or the application data, which is a source of the document) received from the preparation terminal 102.

(6)-1: Upload of DID

The processing apparatus 110 uploads the previously generated DID to the DID server 220. The DID server 220 saves the DID uploaded from the processing apparatus 110.

(6)-2: Update of Metadata

The processing apparatus 110 uploads the previously generated metadata to the metadata server 230. The metadata server 230 saves the metadata uploaded from the processing apparatus 110.

(7): Transmission of Distribution Preparation Completion Notification of eDoc (the Notification is Transmitted to the Reading Terminal Designated in the Metadata)

The processing apparatus 110 transmits a distribution preparation completion notification about the generated eDoc to each reading terminal 104 of the distribution destination. The notification includes the previously generated DID and the information of the document name of the eDoc. Also, the notification may include a thumbnail image of a representative page (a pre-designated page such as a first page) of the eDoc.

Figure 11:
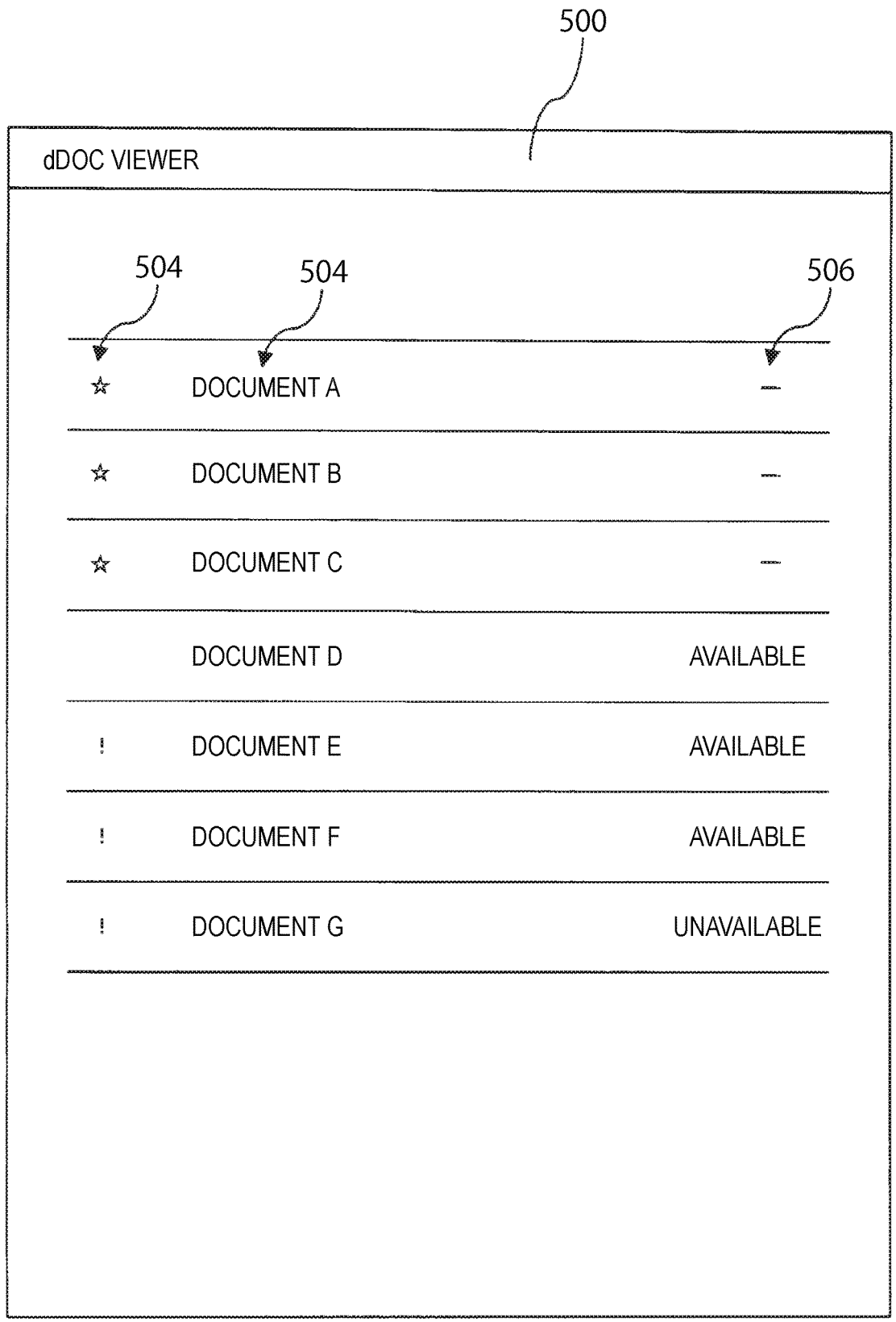
FIG. 11 depicts an example of a list screen.

The user (referred to as 'reader') who uses the reading terminal 104 brings the authentication device 130 close to the card reader unit of the reading terminal 104 for user authentication. The reading terminal 104 displays a list screen for displaying a list of eDocs distributed to the reading terminal. FIG. 11 depicts an example of a list screen 500. In the list screen 500 of the example, a notification mark 502, a document name 504 of the eDoc, and a mark 506 indicating whether reading is permitted or not are included for each eDoc. The notification mark 502 is a mark for notifying the reader of a state of the eDoc. The state of the eDoc indicated by the notification mark 502 includes "recent arrival" (a state where a document is not yet opened after the document is distributed from the processing apparatus 110, which is shown with a "☆" mark in the figure), "normal" (not shown in the figure), "expiration" (a state where an access effective term has elapsed, which is shown with a "!" mark in the figure), and the like. The eDoc in the state "expiration" cannot be read until the latest metadata of the eDoc is acquired from the processing apparatus 110 or the management system 200 even though the eDoc file is saved in the reading terminal 104. The eDoc in the state "normal" may be read even though the reading terminal 104 is in the offline state with respect to the processing apparatus 110 or the management system 200, because the metadata of which the access effective term has not expired is saved (cached) in the reading terminal 104. The mark 506 indicating whether reading is permitted or not indicates whether the combination of the reading terminal 104 and the user (authenticated by the authentication device 130) who uses the reading terminal coincides with the combination of the user and the reading terminal 104 of the distribution destination of the eDoc indicated by the metadata of the eDoc cached in the reading terminal 104. When the combinations coincide with each other, the eDoc may be read (which is shown with "AVAILABLE" in the figure), and otherwise cannot be read (which is shown with "UNAVAILABLE" in the figure). Also, in the case of an eDoc for which the distribution preparation completion notification has been received but of which the eDoc file and the metadata have not been yet received, since the reading terminal 104 does not have information of a determination standard for determining whether the combination coincides with the combination of the distribution destination, the mark 506 indicating whether reading is permitted or not is shown with a "-" mark indicating "not yet determined". In the shown example, since each of three eDocs from above is a recent arrival and the acquisition of an eDoc body (file and metadata) thereof has not yet completed, the mark 506 indicating whether reading is permitted or not is shown with the mark indicating "not yet determined".

The reader selects an eDoc, which the reader intends to read, on the list screen (FIG. 11) by a touch operation, for example, and issues a reading instruction. Here, it is assumed that an eDoc of recent arrival (the notification mark 502 is "☆") is selected as the reading target.

The description returns to FIG. 8.

(8): User ID Key Reading (Device ID Authentication)

Since the reading terminal 104 does not hold the eDoc file and metadata of the selected reading target, the reading terminal is required to acquire the same from the processing apparatus 110. Therefore, the reading terminal 104 transmits the user ID key, which is the authentication information acquired from the authentication device 130 of the reader, to the processing apparatus 110 on the local network 108 to which the reading terminal is connected. The processing apparatus 110 verifies whether the user ID key verifies the user registered in the processing apparatus (user authentication). Here, it is assumed that the user authentication is successful. In the meantime, when the user ID key received from the reading terminal 104 does not coincide with any user registered in the processing apparatus 110, the processing apparatus 110 may transmit the user ID key to the higher-level apparatus (the user ID server 210 or the local user ID server 152) with respect to the user authentication and request the user authentication.

(9)-1: Distribution Request for eDoc

The reading terminal 104 receives the information indicating that the user authentication in the processing apparatus 110 is successful, and transmits, to the processing apparatus 110, a distribution request including the DID of the eDoc, which is the reading target selected by the reader.

(9)-2: Transmission of eDoc (File and Metadata)

The processing apparatus 110 transmits, as a reply, the eDoc file and metadata corresponding to the DID included in the distribution request from the reading terminal 104 to the reading terminal 104.

(10): Reception of eDoc

The reading terminal 104 receives and saves (caches) the eDoc file and metadata transmitted from the processing apparatus 110.

(11): Confirmation of Reading Authority and Generation of Decryption Key

The reading terminal 104 determines whether a combination, which coincides with the combination of the reading terminal and the reader who currently uses the same, exists in the combinations of the distribution destination user and the distribution destination terminal indicated by the distribution destination information (refer to FIG. 3) in the metadata. When a determination result is No, the reader cannot read the eDoc file with the reading terminal 104. In this case, the reading terminal 104 displays an error message indicating that the reader cannot read the eDoc file. Also, in this case, the reading terminal 104 may delete the file (and the corresponding metadata) of the saved eDoc. On the other hand, when it is determined that the combination of the reading terminal 104 and the reader who currently uses the same exists in the distributor information of the metadata, the reading terminal 104 permits the reader to read the eDoc. In this case, the reading terminal 104 takes out a key corresponding to the reader from the encrypted key corresponding to each distribution destination user included in the encryption information of the metadata. The reading terminal 104 decrypts the key with a secret key of the reader (which is held by the authentication device 130, for example), thereby restoring the decryption key necessary to decrypt the eDoc file.

(12): Decryption of eDoc File and Screen Display

The reading terminal 104 decrypts the eDoc file by using the restored decryption key, thereby reproducing the readable document and outputting the document (for example, screen display). Also, the reading terminal 104 controls whether or not to receive an operation instruction on the document from the reader, in accordance with the access authority information included in the metadata. Basically, the reading terminal 104 does not save the restored document in a file. That is, after the reading is over, the eDoc file and the metadata are saved in a non-volatile storage of the reading terminal 104 but the document of the decryption result is not saved.

Figure 12:
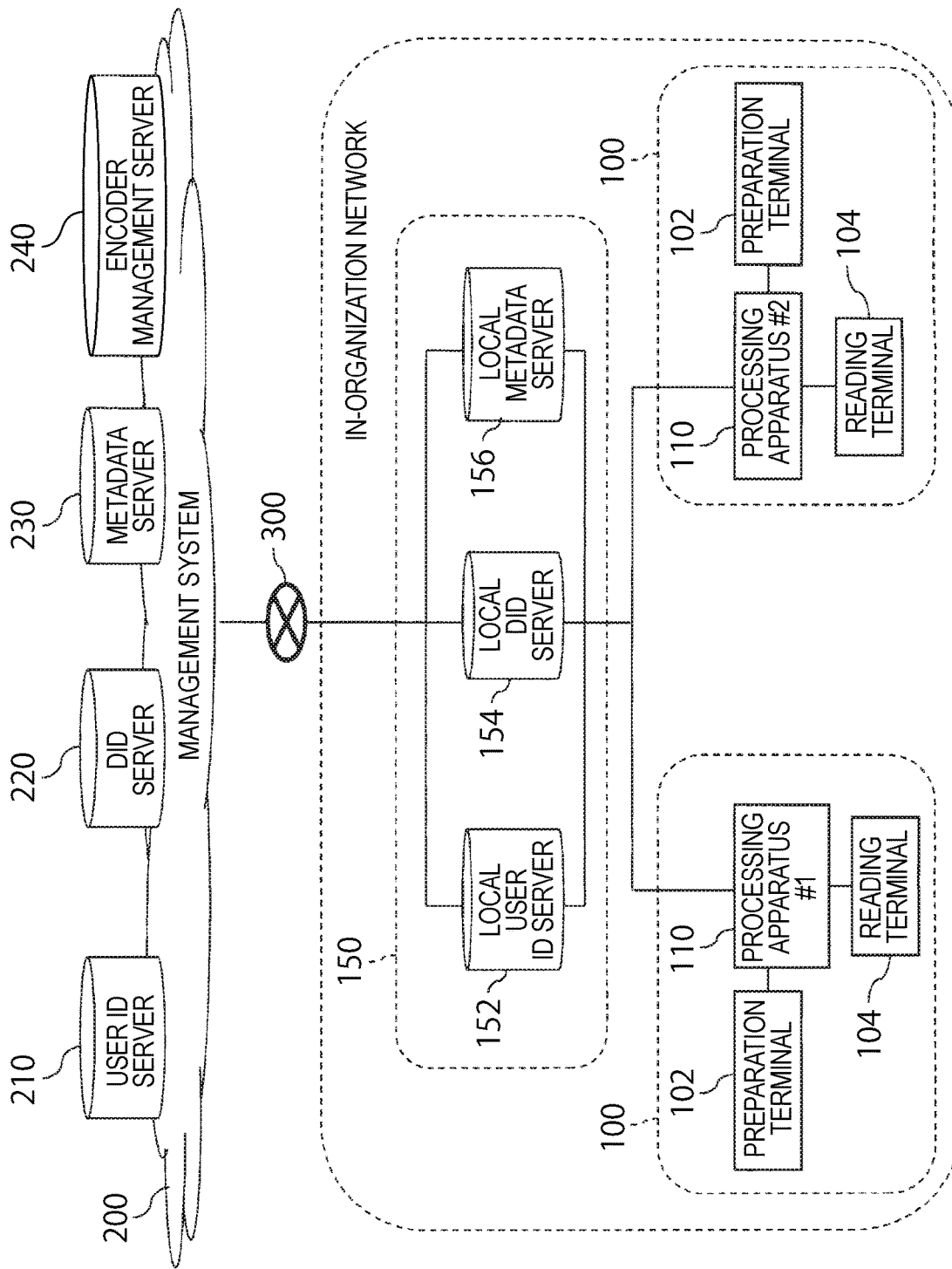
FIG. 12 depicts an example of a system configuration including an in-organization management system.

Subsequently, another example of the document management system of the exemplary embodiment is described with reference to FIG. 12. In the example of FIG. 12, the plurality of local systems 100 is provided in an in-organization network, which is a private network of an organization such as a company. The in-organization network is provided with an in-organization management system 150. The in-organization management system 150 is configured to manage processing in the organization of the document management system and information necessary for the processing. That is, while the management system 200 is operated by a service provider of the document management system and is configured to manage the information and processing relating to the plurality of organizations using the document management system, the in-organization management system 150 is configured to manage the part, which relates to the organization, of the information and processing under management of the management system 200.

The in-organization management system 150 includes a local user ID server 152, a local DID server 154, and a local metadata server 156.

The local user ID server 152 is configured to manage information of users, which are registered as users in the document management system, of members of the organization. The information of each user that is held by the local user ID server 152 is similar to the general information of the user that is held by the user ID server 210 shown in FIG. 4. When the user (i.e., the user of "the predetermined processing apparatus", which is the processing apparatus 110) who acquires and uses the processing apparatus 110 is registered in the processing apparatus 110, the processing apparatus 110 transmits the information of the registered user to the local user ID server 152 in the organization. The local user ID server 152 is configured to save the received information of the user, and to transmit the same to the user ID server 210 of the central management system 200 via the wide area network 10. The user ID server 210 is configured to save the received information of the user. Also, when the information of the user registered in the processing apparatus 110 has changed, the administrator or the like changes the information of the user for the processing apparatus 110. The processing apparatus 110 is configured to transmit information (including the user ID, the item name of the changed information item and a changed value of the item, for example) of the changed content of the user information to the local user ID server 152, and the local user ID server 152 is configured to change the information of the user saved therein, in correspondence to the received changed content. Also, the local user ID server 152 is configured to transmit the information of the received changed content to the central user ID server 210, and the user ID server 210 is configured to change the information of the user held therein, in correspondence to the transmitted information.

The local DID server 154 is configured to receive and save a DID issued by the processing apparatus 110 in each local system 100 belonging to the in-organization network of the organization. The information held in the local DID server 154 is similar to the information held in the DID server 220 shown in FIG. 5. Also, the local DID server 154 is configured to transmit the information of the DID received from the processing apparatus 110 to the central DID server 220, and the DID server 220 is configured to save the information. Also, the local DID server 154 is assigned with an issuance authority and an issuance limit of the DID from the central DID server 220, and is configured to assign the issuance authority and issuance limit of the DID to each processing apparatus 110 under management, based on the issuance authority, within the issuance limit.

The local metadata server 156 is configured to receive and save the metadata of the eDoc generated by the processing apparatus 110 in each local system 100 belonging to the in-organization network of the organization. The information that is held by local metadata server 156 is similar to the information that is held by the metadata server 230. Also, the local metadata server 156 is configured to transmit the metadata received from the processing apparatus 110 to the central metadata server 230, and the metadata server 230 is configured to save the metadata.

In the system of FIG. 12, when the processing apparatus 110 receives a registration (and distribution) request for a document, an acquisition request for the eDoc file or the metadata or the like from a user, which is not registered in the corresponding processing apparatus but is registered in the other processing apparatus 110 in the same organization, the processing apparatus responses to the requests via the in-organization management system 150.

Figure 13:
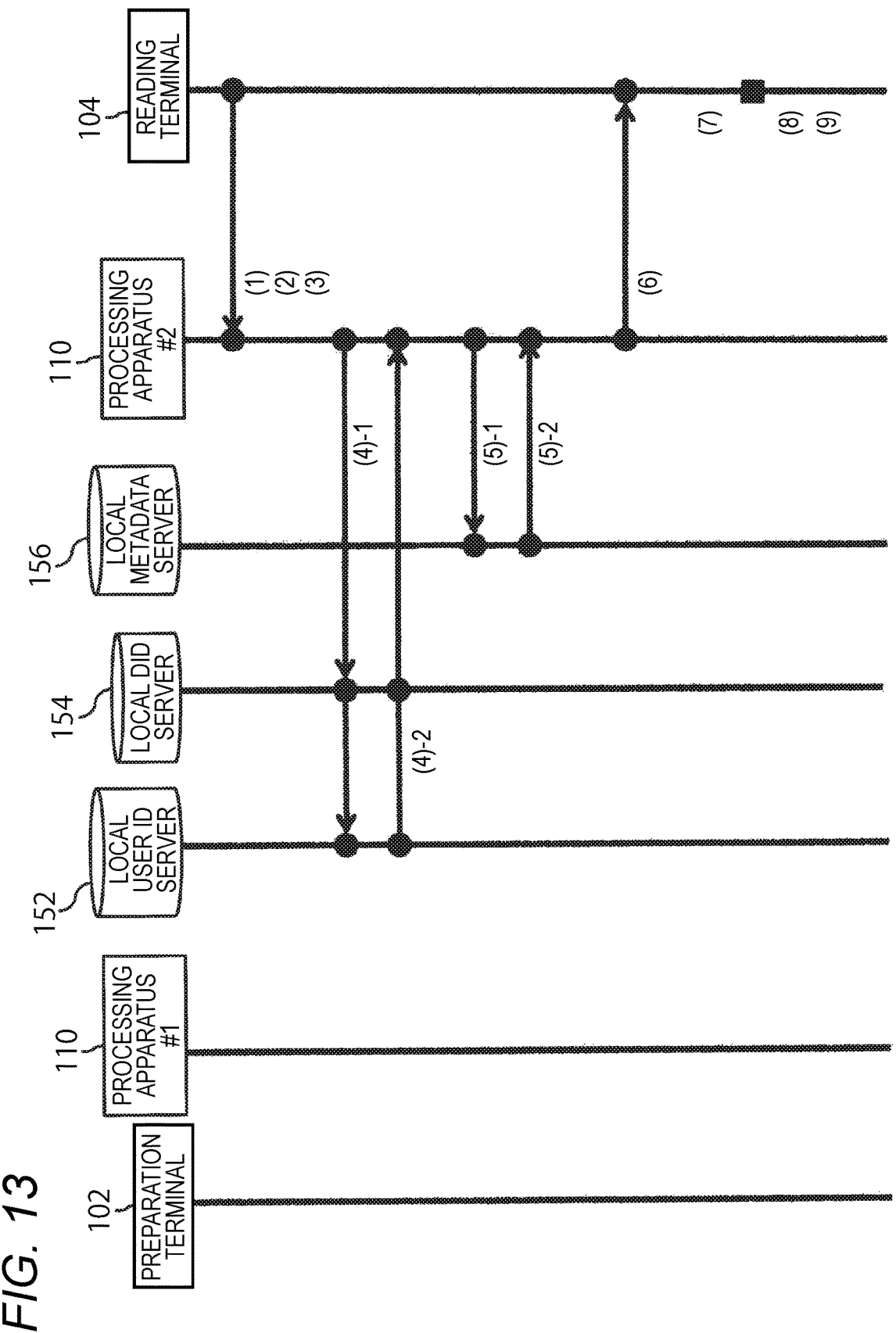
FIG. 13 depicts an example of a flow of processing that is to be executed when a user performs metadata acquisition and reading of a document by a processing apparatus in which the user is not registered.

As one example, a case is considered in which the reader registered in the processing apparatus #1 in the first local system 100 provided in a first department in the in-organization network saves the eDoc registered and distributed to the processing apparatus #1 in the reading terminal 104 of the user and then intends to read the eDoc in a second department under management of the processing apparatus #2. At the point of time at which the reader intends to read the eDoc, it is assumed that the metadata of the eDoc saved in the reading terminal 104 is outdated and the access effective term has elapsed. In this case, when the reader opens the eDoc with the reading terminal 104, the processing shown in FIG. 13 is executed.

First, the reading terminal 104 searches the local network 108 of the second local system 100, to which the reading terminal is currently connected, for the processing apparatus 110. Thereby, the processing apparatus #2 is found. Since the processing apparatus #2 is an apparatus different from the processing apparatus #1 to which the eDoc has been distributed, the processing apparatus #2 does not have the eDoc file or the metadata.

(1): Reading of User ID Key (Device ID Authentication)

The reading terminal 104 reads the user ID key (authentication information) from the authentication device 130 of the reader.

(2): Guest Connection to Processing Apparatus #2 (User ID Key)

In order to perform the user authentication for acquiring the latest metadata of the eDoc, which is instructed as a reading target, the reading terminal 104 transmits, to the processing apparatus #2, the user ID key acquired from the authentication device 130.

(3): Request for Metadata of eDoc to be Read

The reading terminal 104 requests the metadata of the eDoc from the processing apparatus #2. The request includes the DID of the eDoc.

(4)-1: User ID (of Non-Registered User) and DID Authentication

The processing apparatus #2 examines whether the user ID key acquired from the reading terminal 104 belongs to the user registered therein (user authentication). In this example, since the reader is registered in the processing apparatus #1 and is not registered in the processing apparatus #2, the processing apparatus #2 transmits an authentication request including the user ID key to an address of the preset local user ID server 152. Also, the processing apparatus #2 transmits the DID, which is included in the metadata request from the reading terminal 104, to the preset local DID server 154, and requests authentication.

(4)-2: Authentication Confirmation of User ID and DID

The local user ID server 152 verifies whether the user ID key received from the processing apparatus #2 belongs to the user registered therein (user authentication). Since the reader who possesses the user ID key is registered in the processing apparatus #1, the user registration is made in the local user ID server 152, too, which is a higher-level apparatus. Accordingly, the user authentication is successful. The local user ID server 152 replies a response, which indicates that the authentication is successful, to the processing apparatus #2.

Also, the local DID server 154 examines whether the DID of the verification target transmitted from the reading terminal 104 is a proper DID, i.e., is a DID saved therein. In this example, the DID of the eDoc has been issued by the processing apparatus #1 and is saved in the local DID server 154, too, which is a higher-level apparatus with respect to the DID of the processing apparatus #1. Accordingly, it is authenticated that the DID is a proper DID. The local DID server 154 replies a response, which indicates that the DID is a proper DID, to the processing apparatus #2.

(5)-1: Request for Metadata Relating to Target eDoc

Since the user authentication and the DID authentication are successful, the processing apparatus #2 continues the processing for responding to the metadata request from the reading terminal 104. That is, the processing apparatus #2 transmits the metadata request including the DID to an address of the preset local metadata server 156.

(5)-2: Transmission of Requested Metadata (Latest Version)

When the local metadata server 156 receives the metadata request from the processing apparatus #2, the local metadata server returns the metadata corresponding to the DID included in the request to the processing apparatus #2. When the metadata of the eDoc is changed at the processing apparatus 110 from the distributor, the change is immediately reflected on the local metadata server 156. Therefore, the metadata that is returned to the processing apparatus #2 at this time is the latest version of the metadata of the eDoc of the reading target.

(6): Transmission of Requested Metadata (Latest Version)

The processing apparatus #2 transmits the metadata received from the local metadata server 156 to the reading terminal 104.

(7): Reception (Acquisition) of Metadata of Latest Version

The reading terminal 104 receives and saves (caches) the metadata from the processing apparatus #2.

(8): Confirmation of Reading Authority and Generation of Decryption Key Based on User ID The reading terminal 104 checks the authority of the combination of the reading terminal 104 and the reader by referring to the distribution destination information of the received latest metadata. That is, when a combination, which coincides with the combination of the reading terminal 104 and the reader, exists in the combinations of the distribution destination user and the distribution destination terminal indicated by the distribution destination information (refer to FIG. 3) in the metadata, it is determined that there is the reading authority, and otherwise, it is determined that there is no reading authority. When it is determined that there is no reading authority, the reading terminal 104 displays an error. When it is determined that there is the reading authority, the reading terminal 104 takes out a key corresponding to the reader from the encrypted key corresponding to each distribution destination user included in the encryption information of the metadata, and decrypts the key with the secret key of the reader (which is held by the authentication device 130, for example), thereby restoring the decryption key necessary to decrypt the eDoc file.

(9): Decryption of eDoc File and Screen Display

The reading terminal 104 decrypts the eDoc file by using the restored decryption key, thereby reproducing the readable document and outputting the document (for example, screen display). Then, the reading terminal 104 controls whether or not to receive an operation instruction on the document from the reader, in accordance with the access authority information included in the metadata.

Subsequently, referring to FIG. 14, a flow of processing that is performed when the user registered in the processing apparatus #1 of the first local system 100 registers a document in the document management system at the second department under management of the processing apparatus #2 is described. Here, it is assumed that the user (distributor of the document) is not registered in the processing apparatus #2.

(1): Guest Connection to Processing Apparatus #2 (Transmission of Login ID and Password)

When the user instructs the preparation terminal 102 of the user to register a document, the preparation terminal 102 displays a screen for requesting an input of the login authentication information. When the distributor inputs the authentication information (for example, a user ID and a password), in response to the request, the preparation terminal 102 transmits the authentication information to the processing apparatus 110 via the local network 108.

(2): Transmission (Inquiry) of Authentication Information of Non-Registered User The processing apparatus #2 determines whether the authentication information received from the preparation terminal 102 belongs to the user registered therein. As described above, the distributor is not registered in the processing apparatus #2. In this case, the processing apparatus #2 transmits the authentication information to the higher-level local user ID server 152 for authentication.

(3): Authentication Confirmation (Response) of Non-Registered User

The local user ID server 152 determines whether the received authentication information belongs to the user registered therein (user authentication). In this example, since the distributor is a user registered in the processing apparatus #1, the distributor is registered in the local user ID server 152, too, so that the user authentication is successful. The local user ID server 152 replies information, which indicates that the user authentication is successful, to the processing apparatus #2.

(4): Reception of Authentication Result of User (Authentication Established)

When the processing apparatus #2 receives the response, which indicates that the user authentication is successful, from the local user ID server 152, the processing apparatus #2 transmits a response, which indicates that the user authentication is successful, to the preparation terminal 102.

(5): Transmission of Document (+Original Data) and Attribute Data

When the user authentication is successful, the preparation terminal 102 transmits the document, which is selected as a registration target by the user, and the attribute data, which is input by the data, to the processing apparatus #2.

(6): Reception of Document (+Original Data) and Attribute Data

The processing apparatus #2 receives the document and the attribute data from the preparation terminal 102.

(7)-1: Request for DID Issuance Authority and Issuance Limit

When the processing apparatus #2 has used up the issuance authority and the issuance limit of the DID, the processing apparatus #2 requests new issuance authority and issuance limit from the local DID server 154. On the other hand, when there is a remnant in the received issuance limit, the processing apparatus #2 proceeds to step (8) without the request.

(7)-2: Assignment of DID Issuance Authority and Issuance Limit

The local DID server 154 assigns new issuance authority and issuance limit to the processing apparatus #2, in response to the request from the processing apparatus #2. On the other hand, when the issuance limit assigned from the central DID server 220 has been used up, the local DID server 154 requests new issuance authority and issuance limit from the DID server 220, and assigns the issuance authority and issuance limit of the DID to the processing apparatus #2 by using the issuance authority and issuance limit assigned in response to the request.

(8): Generation of DID and Determination (Assignment) of eDID of eDoc File

The processing apparatus #2 issues a DID by using the assigned issuance authority, and assigns the DID to an eDoc (which is generated in next step) that is to be generated from the target document.

(9)-1: Preparation of eDOC File (Unique Format, Decryption)

The processing apparatus #2 generates an encryption key for encrypting the target document, encodes the target document to the dedicated format of the system, and encrypts the encode result by the previously generated encryption key, thereby generating an eDoc file.

(9)-2: Preparation of Metadata

The processing apparatus #2 adds the previously generated DID, the encode date and time and the like to the attribute data received from the preparation terminal 102, thereby generating metadata of the eDoc (10): Upload of DID and Metadata The processing apparatus #2 uploads the generated DID to the local DID server 154 and the generated metadata to the local metadata server 156, respectively. The local DID server 154 adds the DID uploaded from the processing apparatus #2 to the issued DID list (refer to FIG. 5) corresponding to the issuance authority key included in the DID, and uploads the same to the central DID server 220. The DID server 220 adds the DID uploaded from the local DID server 154 to the issued DID list (refer to FIG. 5) corresponding to the issuance authority key. Also, the local metadata server 156 saves the metadata uploaded from the processing apparatus #2, and uploads the same to the central metadata server 230. The metadata server 230 saves the metadata uploaded from the local metadata server 156.

The processing apparatus #2 distributes the generated eDoc to the distribution destination designated by the distributor. This processing is similar to steps (7) to (12) of FIG. 8.

(11): Transmission of eDoc

Also, the processing apparatus #2 transmits the generated eDoc file and metadata to the preparation terminal 102. The processing apparatus #2 may save the eDoc file and the metadata in the processing apparatus #2 or delete the eDoc file and the metadata without saving the same in the processing apparatus #2. When deleting the eDoc file and the metadata without saving the same in the processing apparatus #2, the eDoc file and the metadata are saved only in the processing apparatus #1, which is the predetermined processing apparatus in step (13) to be described later, of the processing apparatus 110 group in the organization. The processing apparatus 110 may set whether the processing apparatus 110, which is not the predetermined processing apparatus of the distributor, will save the eDoc file and the metadata of which registration and distribution is requested from the distributor.

(12): Reception and Temporary Save of eDoc

The preparation terminal 102 saves the eDoc file and metadata received from the processing apparatus 110 so as to later transfer the same to the processing apparatus #1, which is the predetermined processing apparatus of the distributor.

(13): Upon Connection to Processing Apparatus #1 of Home, Synchronization of eDoc and Save of Original Data of Compressed Version When the distributor returns to the first department, to which the distributor belongs, via the preparation terminal 102, the preparation terminal 102 searches for the processing apparatus #1, which is the predetermined processing apparatus of the distributor, on the first local network 108. When the processing apparatus #1 is found, the preparation terminal 102 registers the eDoc file and metadata saved in step (12) in the processing apparatus #1. Thereby, when the distributor intends to change the content (for example, the distribution destination) of the metadata, the distributor may access the predetermined processing apparatus #1 to perform a change operation.

In the document management system of the exemplary embodiment as described above, the body information (i.e., the eDoc file) of the document of which distribution from the preparation terminal 102 to the processing apparatus 110 has been instructed is just provided to the processing apparatus 110 and the reading terminal 104 of the distribution destination and does not appear on the other network and apparatuses. For this reason, the leakage risk of the eDoc file is minimized. In particular, when the distribution destination of the eDoc file is limited to the reading terminal 104 on the local network 108 having generated the eDoc, the eDoc is never leaked outside from the local network 108.

In the meantime, the metadata of the eDoc is registered in the central management system 200 or the in-organization management system 150 of each organization, and may be obtained via the wide area network 10 or the private network of the organization even when the reading terminal 104 is moved to diverse places. When the reading terminal 104 receives the reading instruction of the eDoc from the user, the reading terminal acquires the latest metadata of the eDoc from the in-organization management system 150 or the central management system 200, and determines whether or not to permit the user to read the eDoc, based on the distribution destination information included in the latest metadata. Even though the user is designated as the distribution destination upon the registration and distribution of the eDoc, when the user is excluded from the distribution destination due to the later change of the distribution destination, the user is not permitted to read the eDoc.

Figure 14:
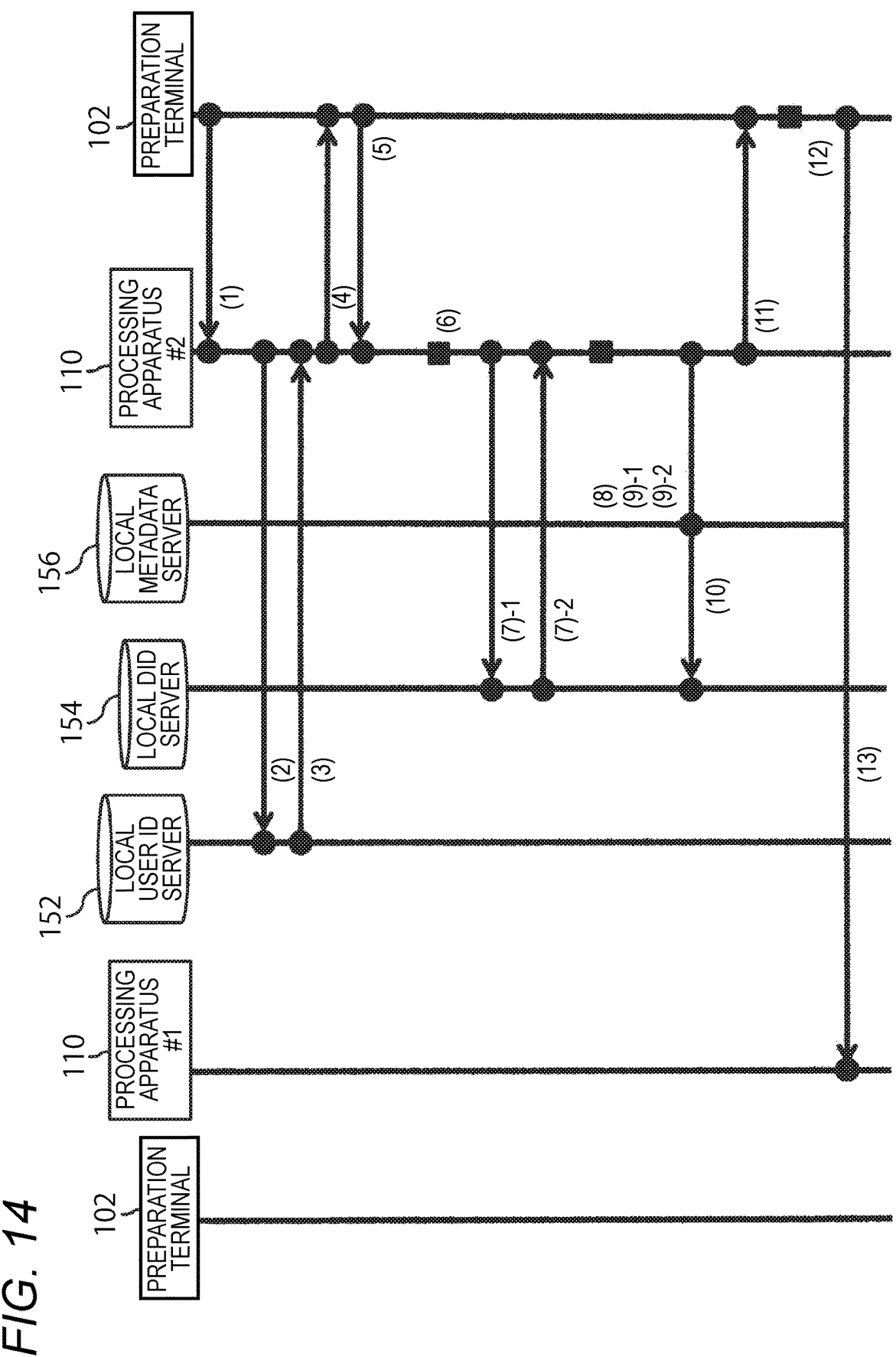
FIG. 14 depicts an example of a flow of processing that is to be executed when the user registers a document in the document management system by using the d processing apparatus in which the user is not registered.

In the examples of FIGS. 13 and 14, it is assumed that both the processing apparatus #1 and the processing apparatus #2 are equipped in the same organization and the user of the distribution destination also belongs to the organization. Therefore, the user authentication is performed at the local user ID server 152 of the organization. In contrast, when the reader is a user who belongs to an organization different from the processing apparatus #2, the distributor cannot be authenticated at neither the processing apparatus #2 nor the higher-level local user ID server 152. In this case, the further higher-level user ID server 210 may perform the user authentication of the distributor.

In the examples of FIGS. 13 and 14, the other processing apparatus #2 relays the communication between the reading terminal 104 of the user registered in the processing apparatus #1 and the local user ID server 152 or the local metadata server 156. However, this is just exemplary. Instead of this configuration, for example, the processing apparatus #2 may transmit a response, which indicates that the authentication is impossible, to the reading terminal 104, when it is determined that the user is not registered in the processing apparatus #2, from the authentication information of the user transmitted from the reading terminal 104. In this case, the reading terminal 104 requests the authentication from the local user ID server 152 by using the address information of the higher-level apparatus registered in the reading terminal, and accesses the local metadata server 156 and acquires the necessary metadata when the authentication is successful.

In the example of FIG. 13, the user moves to the local system 100, which is under management of the processing apparatus 110 separate from the predetermined processing apparatus of the user, in the organization to which the user belongs, and reads the document. However, the user may read the document distributed from the predetermined processing apparatus of the user, at an outside of the organization to which the user belongs. In this case, the reading terminal 104 of the user is subjected to the authentication at the user ID server 210 in the central management system 200, and acquires the metadata of the document to be read from the metadata server 230.

<Example of DID>

Figure 15:
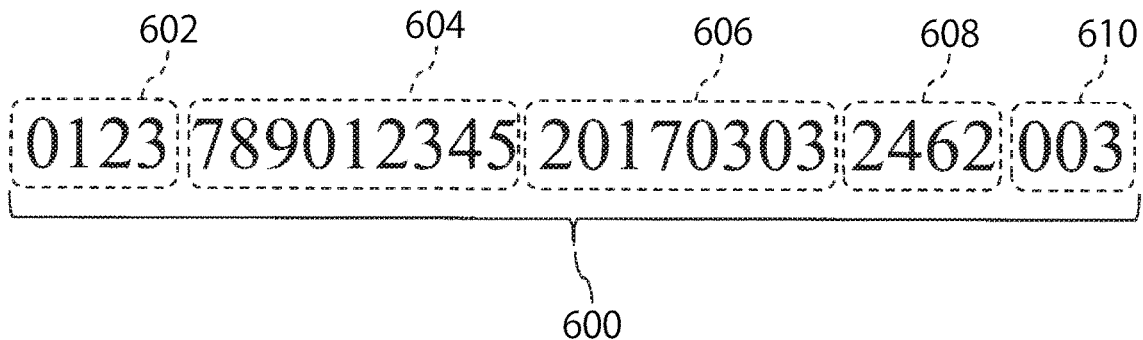
FIG. 15 depicts an example of data content of a DID.

Subsequently, a configuration of a DID 600, which is used for the identification information of the eDoc in the document management system, is described with reference to FIG. 15.

As shown, the DID 600 includes an issuance authority key 602, processing apparatus-specific information 604, an issuance date 606, an issuance certification key 608, and an issuance number 610. In the meantime, the shown DID 600 and the digit numbers of the constitutional elements 602 to 610 are just exemplary.

The issuance authority key 602 is key information for identifying the issuance authority assigned to the processing apparatus 110 by the DID server 220. When the DID server 220 receives a request for the issuance authority and the issuance limit from the processing apparatus 110, the DID server generates the issuance authority key 602, and transmits the issuance authority key 602 to the processing apparatus 110, together with the numerical value of the issuance limit (for example, the number of documents: 100). In the meantime, in a system configuration where the local DID server 154 is interposed between the DID server 220 and the processing apparatus 110, the DID server 220 collectively assigns a plurality of sets of the issuance authority key and the issuance limit to the local DID server 154, for example. This assignment may be understood as the DID server 220 requests the local DID server 154 to execute processing of assigning the plurality of sets of the issuance authority key and the issuance limit to the processing apparatus 110. When the local DID server 154 receives the request for the issuance authority from the processing apparatus 110 under management, the local DID server may assign a set, which has not been assigned yet, of the assigned plurality of sets of the issuance authority key and the issuance limit to the processing apparatus 110.

The processing apparatus-specific information 604 is information specific to the processing apparatus 110 having issued the DID. That is, it is possible to uniquely specify the processing apparatus 110 having issued the DID 600 by examining the processing apparatus-specific information 604 in the DID 600. The processing apparatus-specific information 604 is held by the processing apparatus 110.

The issuance date 606 is a character string indicative of a date at which the DID has been issued. The issuance date of the DID is also a date at which the eDoc, which is the assignment destination of the DID, has been generated (encoded).

The issuance certification key 608 is key information verifying that the processing apparatus 110 (which is specified by the processing apparatus-specific information 604) has issued the DID by using the issuance authority indicated by the issuance authority key 602. The issuance certification key 608 is a value obtained by encrypting the issuance authority key 602 with the secret key of the processing apparatus 110, for example. In this case, when a value obtained by decrypting the issuance certification key 608 with the secret key of the processing apparatus 110 coincides with the issuance authority key 602, it is verified that the processing apparatus 110 has issued the DID 600 by using the issuance authority key 602. Also, a value obtained by encrypting a value (or a hash value having a predetermined digit number generated from the value) of a part except the issuance authority key 602 of the DID 600 with the secret key of the processing apparatus 110 may be set as the issuance certification key 608. In this case, when a value obtained by decrypting the issuance certification key 608 with the public key of the processing apparatus 110 is not conflicted to a value of a part except the issuance certification key 608 of the DID 600 (for example, the decryption result coincides with the hash value of the value), it is verified that the processing apparatus 110 has issued the DID 600 on the basis of the issuance authority key 602 and the part except the issuance certification key 608 of the DID 600 has not been falsified.

The issuance number 610 is a serial number indicating what number of the DIDs, which the processing apparatus 110 has issued by using the issuance authority key 602, the DID 600 is. A maximum value of the issuance number 610 of the DID 600 generated using any issuance authority key 602 is the value (number of documents) of the issuance limit assigned by the DID server 220 (or the local DID server 154) together with the issuance authority key 602.

<Change of Distribution Destination after Registration>

In the meantime, a case is also considered in which after registering the eDoc in the document management system, the distributor (or a person having authority to change the distribution destination) intends to delete or add the distribution destination or to modify the access authority to the eDoc assigned to the distribution destination. In this case, the distributor accesses the predetermined processing apparatus 110, for example, designates the DID of the target eDoc and instructs execution of editing processing of the distribution destination (or the access authority) by using the preparation terminal 102 or the reading terminal 104 (hereinafter, collectively referred to as the user terminal).

The processing apparatus 110 having received the instruction provides the user terminal with an editing screen of the distribution destination and the access authority when it is confirmed by the user authentication that the user having issued the instruction is a proper distributor or the like (a collective term of the distributor and other person to which the authority to change the distribution destination is assigned) of the target eDoc. The editing screen is preferably similar to the input screen 400 shown in FIG. 9. The distributor or the like adds or deletes the user and reading terminal of the distribution destination and changes the access authority content, on the editing screen. When the distributor or the like performs the necessary change on the editing screen and then performs an operation of confirming the change, the processing apparatus 110 reflects the change on the saved metadata of the eDoc and notifies the changed content to the higher-level local metadata server 156 and metadata server 230. The local metadata server 156 and the metadata server 230 reflect the notified changed content on the saved metadata of the eDoc. For example, when a user, which has been designated as the distribution destination upon the distribution, is thereafter deleted from the distribution destination due to the change, the user cannot read the eDoc. Also, when the distribution destination information in the metadata of the eDoc is changed in this way, the processing apparatus 110 may transmit an instruction to delete the eDoc file (and the corresponding metadata) to the reading terminal 104 of the distribution destination, which has been included in the distribution destination information before the change but is not included in the distribution destination information after the change.

In the above example, the processing apparatus 110 receives the instruction to change the distribution destination and access authority of the eDoc. However, instead of this configuration or in addition to this configuration, the higher-level apparatus, i.e., the management system 200 (the metadata server 230) or the in-organization management system 150 (the local metadata server 156) may be configured to receive the change instruction. In this case, the higher-level apparatus is configured to transmit the new metadata changed in correspondence to the change instruction to the processing apparatus 110 (and the local metadata server 156 of the organization to which the processing apparatus 110 belongs) so as to replace the existing metadata in the processing apparatus 110 with the same.

<Status Management of Processing Apparatus>

Subsequently, the control based on the status management of the processing apparatus 110 is described.

The processing apparatus 110 is configured to periodically notify a status thereof to the management system 200. In the management system 200, the processing apparatus management server 240 is configured to add the received status to the status hysteresis 242 of the processing apparatus 110, in association with the receiving date and time. Also, the processing apparatus management server 240 is configured to check the received status and to control whether it is possible or impossible to provide a service to the user of the processing apparatus 110, in accordance with a result of the check.

Figure 6:
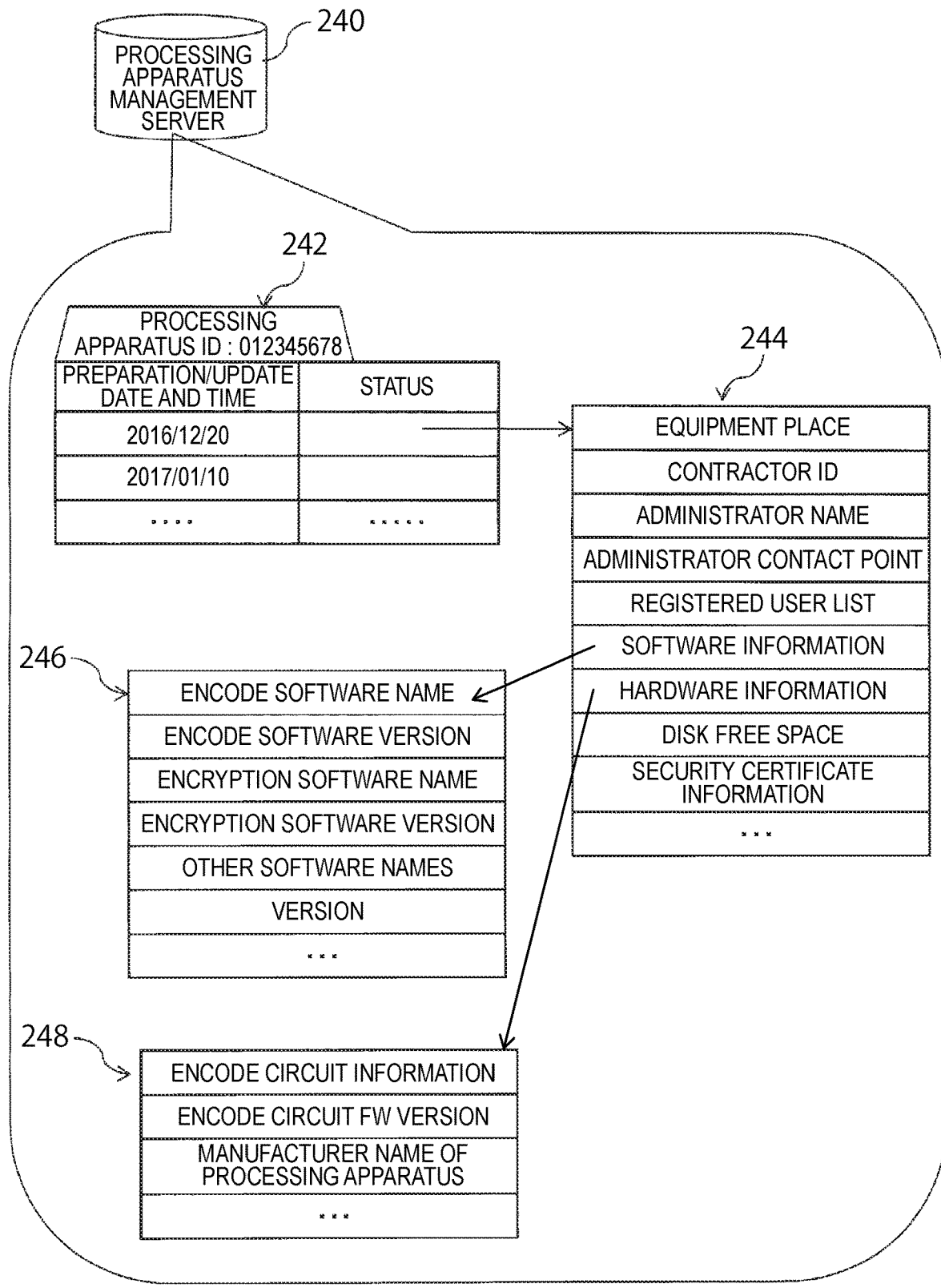
FIG. 6 exemplifies data content that is managed by a processing apparatus management server.

The status that is periodically transmitted to the processing apparatus management server 240 by the processing apparatus 110 includes items similar to the status 244 of the processing apparatus shown in FIG. 6. However, the equipment place, the encode circuit information, the manufacturer name of the processing apparatus and the like, which are not changed in accordance with the processing apparatus 110, of the status 244 may not be periodically transmitted.

Figure 16:
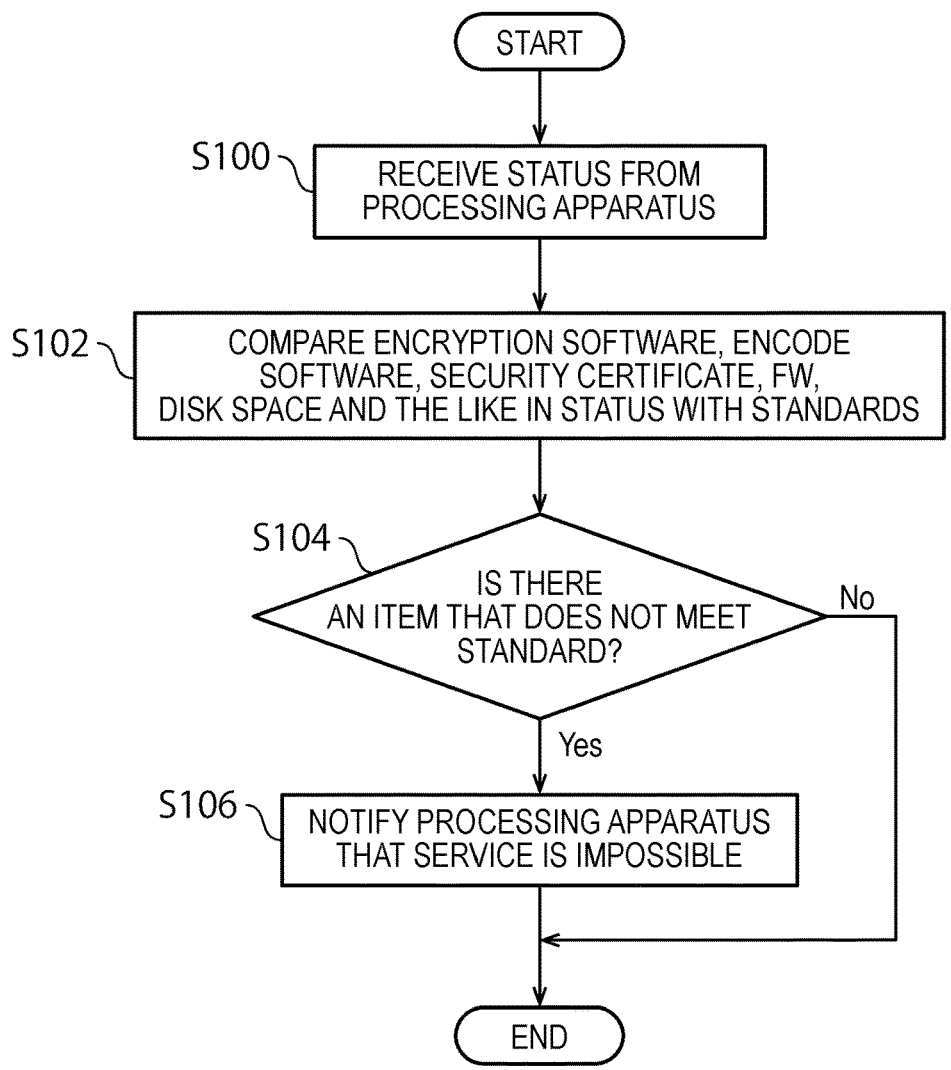
FIG. 16 depicts an example of a flow of status check processing of the processing apparatus, which is to be executed by the processing apparatus management server.

The processing apparatus management server 240 is configured to execute processing exemplified in FIG. 16, for example, on the basis of the status transmitted from the processing apparatus 110.

First, when the processing apparatus management server 240 receives the status from the processing apparatus 110 (S100), the processing apparatus management server compares values of check target items of the status with standards of the respective items (S102). The check target items include a name and a version of the encryption software, a name and a version of the encode software, the security certificate installed in the processing apparatus 110, the information (for example, the identification information and install date and time of the encryption key, and the like) of the encryption key (for example, a pair of the secret key and the public key, which is used for communication channel encryption and signature, and the like) installed in the processing apparatus 110, a name and a firmware (FW) version of the encode circuit, types of mounted fonts, and a free space of the disk (secondary storage). Also, examples of the standards of the respective items include a standard that the encryption software, the encode software or the firmware is the latest version or a version after any version, a standard that the free space of the disk is equal to or larger than a predetermined threshold, a standard that a certificate described in a black list is not included in the installed security certificate, a standard that a predetermined time period has not elapsed after the encryption key of the processing apparatus 110 has been installed, a standard that a predetermined type of a font is installed, and the like.

For example, the encryption key that is to be used for communication channel encryption, signature and the like by the processing apparatus 110 is preferably periodically changed to a new key so as to keep the safety thereof. Therefore, in the case of an encryption key, for which a predetermined time period has elapsed from the install date and time thereof, the processing apparatus management server 240 determines that the encryption key does not meet the standard, and disables the service provision or issues a warning, which indicates that the service provision will be disabled, thereby urging replacement into a new key.

The processing apparatus management server 240 determines whether the check target items of the status received from the processing apparatus 110 include a check target item, which does not meet the standard of the item (S104). When there is no corresponding item, the processing apparatus management server ends the processing for the processing apparatus 110 of which the status has been received. When it is determined in S104 that there is an item not meeting the standard, the processing apparatus management server 240 notifies the processing apparatus 110 that the service is not possible (S106). The processing apparatus 110 having received the notification indicating that the service is not possible stops the registration (distribution) service of the document to the document management system of the exemplary embodiment. That is, the processing apparatus does not receive the registration (distribution) request for the document from the preparation terminal 102 and replies a message indicating that the service is under suspension.

According to the above control, the possibility that the processing apparatus 110 will generate an eDoc, which does not meet the standards, is reduced. For example, according to the above control, the service of the processing apparatus 110 is stopped before an eDoc of which a level of encryption made by the old encryption software is not sufficient is generated. Also, the service is stopped before a situation occurs in which an error is caused in the generation processing of an eDoc due to the insufficient free space of the disk or the old firmware, so that the document is leaked. Also, the service is stopped before the processing apparatus 110 having no predetermined font replaces the corresponding font in a document with another font and encodes the same, so that an image quality of an eDoc is deteriorated. Also, for example, a situation where the firmware of the encode circuit is old, so that an image size of the document to be supported by the latest firmware is not supported and an image size of an eDoc is limited is also difficult to occur.

In the meantime, an item that is to influence the security of an eDoc and an item that is not to influence may be classified as the check target items of the status, and the service of the processing apparatus 110 may be stopped only when the former item does not meet the standard. When the latter item does not meet the standard, the processing apparatus management server 240 issues a warning to the processing apparatus 110 or the administrator thereof for urging solution of malfunction of the item. Receiving the warning, the administrator of the processing apparatus 110 repairs the processing apparatus 110 with respect to an item that may be addressed by the administrator, and requests the system operator to dispatch a specialized repair operator with respect to an item that should be managed by the repair operator. Also, when it is perceived that a specific item of the check target items does not meet the standard, the processing apparatus management server 240 may automatically make preparation for dispatching the repair operator to the processing apparatus 110.

A modified embodiment of the processing shown in FIG. 16 is described with reference to FIG. 17.

Figure 17:
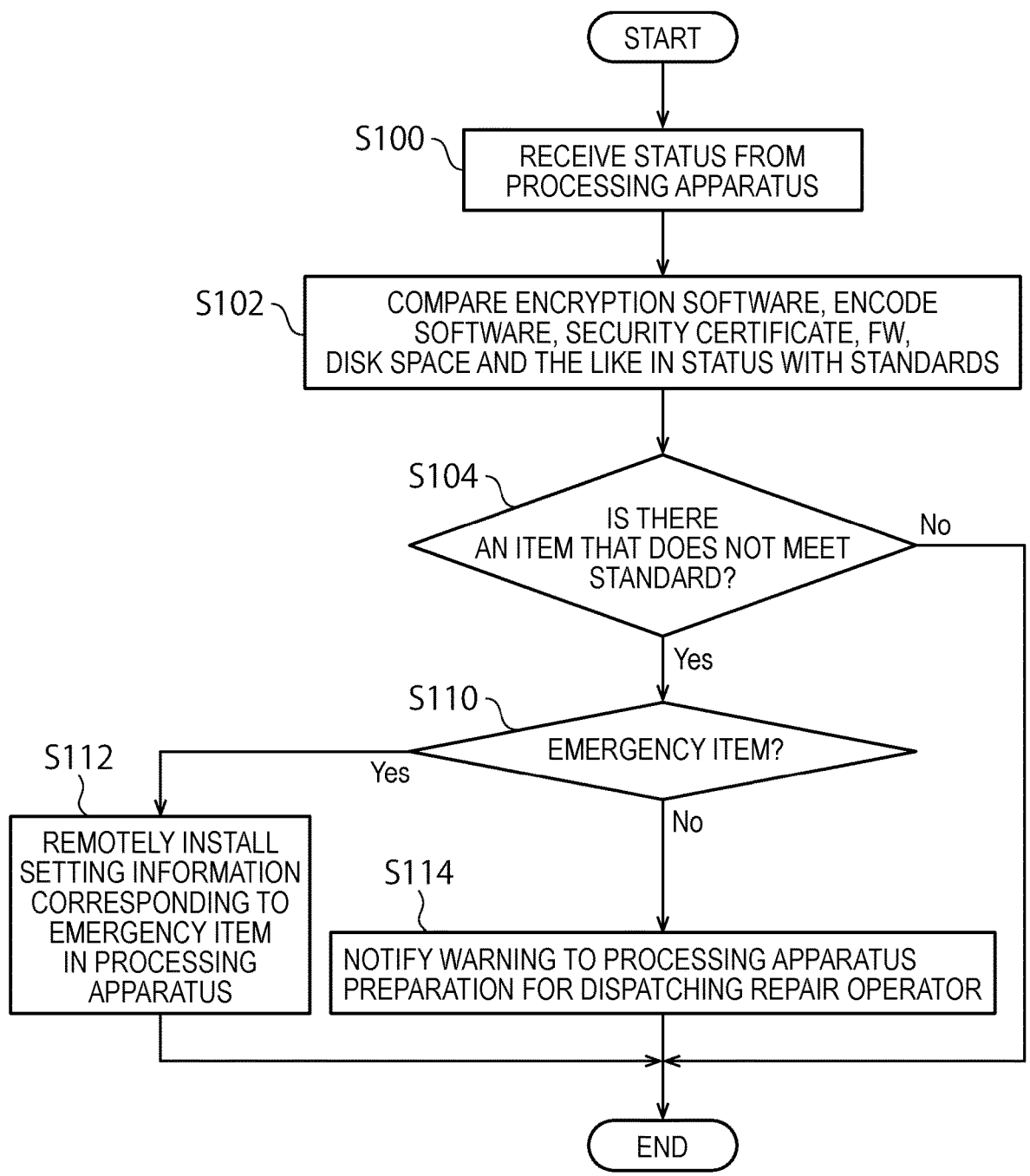
FIG. 17 depicts another example of the flow of the status check processing of the processing apparatus, which is to be executed by the processing apparatus management server.

In a sequence of FIG. 17, as the check target items of the status of the processing apparatus 110, a level classification of an emergency item and the others is introduced. The emergency item is an item that is to highly influence a security quality of an eDoc, which is to be generated by the processing apparatus 110, and a security of the document management system. An eDoc generated by the processing apparatus 110 of which the item does not meet the standard may not secure the sufficient safety. Also, when the processing apparatus 110 of which the item does not meet the standard continues the operation thereof, the processing apparatus 110 may become a security hole (vulnerability) of the document management system. Examples of the target of the emergency item may include a case where vulnerability is found in the version of the encryption software, the security certificate installed in the processing apparatus 110 and the encryption key installed in the processing apparatus 110, and the like.

One method of avoiding a problem that is caused as a result that the emergency item does not meet the standard includes stopping the processing apparatus 110 of which the emergency item does not meet the standard, and dispatching the repair operator to perform correction or repair with respect to the emergency item. However, the user cannot use the processing apparatus 110 until the correction is completed.

Therefore, in the sequence of FIG. 17, when an item that does not meet the standard is found in S104, the processing apparatus management server 240 determines whether the item is the emergency item (S110). When the item is the emergency item, the processing apparatus management server 240 remotely installs setting information for correcting the malfunction of the emergency item in the processing apparatus 110 via the wide area network 10 (S112). Examples of the setting information for correcting the malfunction of the emergency item include the encryption software of the latest version, the security certificate of the latest version in which the vulnerability found in the security certificate has been addressed, a new key pair for replacing the pair of the secret key and the public key in which the vulnerability of the processing apparatus 110 was found, and the like.

For example, in the case of the new key pair, the processing apparatus management server 240 prepares a phrase for generating the new key pair, generates a key pair by using the phrase and transmits and remotely installs the generated key pair in the processing apparatus 110 in a secure manner.

Thereby, the setting information for the emergency item that does not meet the standard in the processing apparatus 110 is updated to the setting information that meets the standard. Also, the value of the emergency item of the status of the processing apparatus 110 is updated in correspondence to the update.

Also, when a determination result in S110 is No (the item does not correspond to the emergency item), the processing apparatus management server 240 transmits a warning, which indicates the item that does not meet the standard, to the processing apparatus 110 or the administrator, and makes preparation for dispatching the repair operator so as to correct the corresponding item of the processing apparatus 110 (S114). In the case of the item that is not the emergency item, a critical problem is difficult to occur with respect to the security even when the processing apparatus 110 continues the operation thereof. Therefore, the repair operator is just dispatched to cope with the item without stopping the processing apparatus 110. Since the items other than the emergency item may not be remotely installed by the processing apparatus management server 240, an increase in load of the processing apparatus management server 240 is avoided.

In the example of FIG. 17, the setting information relating to the emergency item is installed in the processing apparatus 110 from the processing apparatus management server 240 in a top-down manner, and the setting information is correspondingly installed in the processing apparatus 110, so that the value of the emergency item of the status of the processing apparatus 110 is updated. In contrast, in the case of the items other than the emergency item, the repair operator sets and changes the values thereof at each processing apparatus 110, and installs the setting information (for example, the latest version of the encryption software) corresponding to the items. The setting and change of the status item value made in this manner at the processing apparatus 110 are notified to the higher-level processing apparatus management server 240, so that the processing apparatus management server 240 changes the value of the item, which is provided for the processing apparatus management server and corresponds to the item of the status of the processing apparatus 110, in correspondence to the notification.

<Verification of DID>

When the issued DID is notified from the processing apparatus 110, when the request (including the DID) of the metadata is transmitted from the reading terminal 104 or when a verification request for the DID is received from the user, the management system 200 verifies whether the DID is right.

In this case, the DID server 220 verifies the target DID 600 (refer to FIG. 15) with respect to followings.

(a) There should be no contradiction between the issuance authority key 602 and the processing apparatus-specific information 604 in the DID 600.

The DID server 220 examines whether the issuance authority key 602 is recorded in the information (refer to FIG. 5) recorded therein, as the issuance authority key in which the processing apparatus 110 indicated by the processing apparatus-specific information 604 is set as the assignment destination. When an examination result is no, it means that the issuance authority key 602 has not been issued to the processing apparatus 110 indicated by the processing apparatus-specific information 604. This is contradictory. In this case, the DID 600 is an improper DID.

(b) There should be no contradiction between the issuance authority key 602 and the issuance date 606 in the DID 600.

The DID server 220 records the key assignment date and time and key end date and time, in association with the issuance authority key (refer to FIG. 5). When the issuance date 606 in the DID 600 deviates from a time period ranging from the key assignment date and time to key end date and time, which are recorded in association with the issuance authority key 602 of the DID 600, the issuance authority key 602 and the issuance date 606 are contradictory to each other. In this case, the DID 600 is an improper DID.

(c) There should be no contradiction among the issuance authority key 602, the processing apparatus-specific information 604 and the issuance certification key 608 in the DID 600.

The DID server 220 decrypts the issuance certification key 608 with the public key of the processing apparatus 110 indicated by the processing apparatus-specific information 604, and determines whether the issuance certification key 604 indicated by the decryption result coincides with the issuance certification key 608 in the DID 600. When the keys do not coincide with each other, there is a contradiction among the three parties. Therefore, it is possible to perceive that the DID 600 is improper.

(d) The issuance number 610 in the DID 600 should not be contradictory to the issuance limit corresponding to the issuance authority key 602.

The DID server 220 records the issuance limit assigned to the processing apparatus 110 together with the issuance authority key 602 (refer to FIG. 5). When the issuance number 610 in the DID 600 is a number larger than the issuance limit recorded in the issuance authority key 602, the DID is improper.

(e) The issuance number 610 in the DID 600 should not be contradictory to the issuance number of the issued DID including the same issuance authority key as the issuance authority key 602 of the DID 600. When a newly issued DID is notified from the processing apparatus 110, this standard is used to verify whether the newly issued DID is contradictory to the already issued DID.

The DID server 220 records the DID, which is issued using the issuance authority key, and the information of the issuance date and time thereof, in association with the issuance authority key (the issued DID list in FIG. 5). The DID server 220 examines whether there is a DID, which has the same issuance number as the issuance number 610 in the DID 600, in the issued DIDs having the same issuance authority key as the issuance authority key 602 of the DID 600, which is a verification target. If an examination result is Yes, it is determined that the DID 600 is improper.

(f) The combination of the issuance date 606 and the issuance number 610 in the DID 600 should not be contradictory to the combination of the issuance date and the issuance number of the issued DID including the same issuance authority key as the issuance authority key 602 of the DID 600.

The DID server 220 determines whether the combination of the issuance date 606 and the issuance number 610 of the DID 600, which is a verification target, is contradictory to the combination of the issuance date and the issuance number of each of the issued DIDs including the same issuance authority key as the issuance authority key 602 of the DID 600, i.e., whether there is a DID of which anteroposterior relation is opposite to the verification target. For example, when an issued DID of which the issuance date is later than the DID 600 but the issuance number is smaller is found, the anteroposterior relation is reversed, so that the DID 600 and the issued DID are contradictory to each other. When the contradiction is found, it is determined that only the DID 600, which is a verification target, or both the DID 600 and the issued DID are improper.

When it is determined on the basis of the standards as described above that any DID is improper, the DID server 220 notifies a warning to the administrator of the processing apparatus 110 relating to the improper DID by an e-mail or the like. The warning notification includes a message notifying that the DID falsified as being issued by the processing apparatus 110 has been found. The administrator performs measures and policies for security improvement by the notification. The administrator of the processing apparatus 110 or a contact point thereof may be obtained from the information (refer to FIG. 6) of the processing apparatus management server 240. The processing apparatus 110, which is a destination of the warning notification and relates to the improper DID, is the processing apparatus 110 indicated by the processing apparatus-specific information 604 included in the DID. Also, the processing apparatus 110 that has previously assigned the same issuance authority key as the issuance authority key included in the improper DID may be set as a destination of the warning notification.

<Processing that is to be Performed when Vulnerability has been Found in Code of eDoc>

Subsequently, processing that is to be performed when vulnerability has been found in the encryption software used for encryption upon the generation of the eDoc file is described. When the administrator of the document management system perceives that the vulnerability has been found in a specific version of the encryption software used by any one processing apparatus 110, the administrator transmits a vulnerability notification to each processing apparatus 110 from the management system 200. The vulnerability notification includes information of a software name and a version of the encryption software in which the vulnerability has been found. When there is the in-organization management system 150, the vulnerability notification is transmitted from the management system 200 to the in-organization management system 150, and the in-organization management system 150 transmits the vulnerability notification to each subordinate processing apparatus 110. The processing apparatus 110 executes processing exemplified in FIG. 18, in response to the notification.

When the processing apparatus 110 receives the vulnerability notification from the higher-level apparatus (the management system 200 or the in-organization management system 150) (S200), the processing apparatus 110 specifies a file, which was encrypted by the processing apparatus, with the version of the encryption software having the vulnerability indicated by the notification (S202). In the document DB 116 of the processing apparatus 110, each eDoc file and the metadata thereof generated by the processing apparatus 110 are saved, so that it is possible to perceive a name and a version of the encryption software used for generation of each eDoc from the metadata of each eDoc file (refer to the structure example of the metadata shown in FIG. 3). In S202, the processing apparatus 110 specifies an eDoc of which a combination of the name and version of the encryption software included in the metadata coincides with the combination indicated by the vulnerability notification.

Then, the processing apparatus 110 re-encrypts each of the specified eDoc files with the version of the encryption software that is installed therein and is currently used (S204). In this example, it is assumed that the encryption software of the processing apparatus 110 is appropriately version-upgraded and the vulnerability is not found in the current version of the encryption software of the processing apparatus 110. In general, it is thought that the vulnerability is found in the version of the encryption software previously used by the processing apparatus 110, in many cases. In the meantime, if the version of the encryption software, which is a target of the vulnerability notification, is the current version of the encryption software of the processing apparatus 110, the processing apparatus 110 downloads the latest version of the encryption software from the higher-level apparatus or the like, and performs the re-encryption by using the latest version. It may be assumed that if the vulnerability is found in the latest version of the encryption software that is currently used, the higher-level apparatus has a newer version of the encryption software, in which the vulnerability has been addressed, or information of a distribution source of the encryption software. The re-encryption is executed by decrypting an eDoc file, which is a target, by using the information of the decryption key recorded in the metadata corresponding to the eDoc file and encrypting the decryption result by using a newly generated encryption key with the encryption software having no vulnerability, for example. In the meantime, it is assumed that the metadata saved in the processing apparatus 110 includes the information of the decryption key with being encrypted by the public key of the processing apparatus 110, for example. Likewise, the metadata that is to be transmitted to the higher-level apparatus may include the decryption key thereof encrypted with the public key of the higher-level apparatus.

The processing apparatus 110 updates the metadata of the eDoc file, in correspondence to the re-encryption (S206). That is, the encode date and time and the encryption information (the encryption software name and version information and the key information) in the metadata (refer to FIG. 3) are re-recorded with the date and time of the re-encryption, the encryption software name and version used for the re-encryption and the information of the decryption key for decrypting the encryption. Then, the processing apparatus 110 saves the updated metadata (for example, saves the updated metadata as the latest metadata for the eDoc file), and uploads the same to the higher-level apparatus. The higher-level apparatus saves the uploaded updated metadata.

Then, the processing apparatus 110 executes processing for distributing the eDoc file obtained by the re-encryption to each reading terminal 104 of the distribution destination indicated by the distribution destination information of the metadata (S208). That is, for example, a distribution preparation completion notification is transmitted to each reading terminal 104 of the distribution destination (refer to step (7) in FIG. 8). In this notification, information, which indicates that the eDoc to be distributed is an updated version of the eDoc already updated, may be included, in addition to the DID and the document name. When the reader instructs the eDoc, for which the distribution preparation completion notification is received as a result of the re-encryption, on the list screen 500 (refer to FIG. 11) of the reading terminal 104, as a reading target, the reading terminal 104 having received the distribution preparation completion notification overwrites the eDoc file before the re-encryption saved in the reading terminal with the eDoc file acquired from the processing apparatus 110, in response to the instruction. Also, the reading terminal 104 saves the updated metadata received together with the eDoc file, as the latest metadata of the eDoc. Thereby, the eDoc file encrypted with the encryption software having vulnerability and the metadata corresponding thereto are removed from the reading terminal 104, and are replaced with the eDoc file re-encrypted with the encryption software having no vulnerability and the metadata.

In the meantime, when or before transmitting a reading preparation completion notification of the re-encrypted eDoc, the processing apparatus 110 may explicitly transmit a deletion notification including the DID of the eDoc to each reading terminal 104 of the distribution destination. In this case, each reading terminal 104 deletes the existing eDoc file (the eDoc file before the re-encryption) having the DID, in response to the instruction. At this time, the existing metadata may also be deleted.

<Other Examples of Distribution Destination Terminal Designation>

In the above example, the user and the reading terminal 104 of the distribution destination, which may be selected on the UI screen (the input screen 400 in FIG. 9) of the preparation terminal 102 by the distributor, are limited to the user and the reading terminal 104 registered in the processing apparatus 110 of the same local system 100 or the user and the reading terminal 104 registered in the in-organization management system 150 of the same organization (in this case, the user and the reading terminal 104 registered in the other processing apparatus 110 may also be designated as the distribution destination).

However, in a conference where a user inside the organization and a person (guest) outside the organization are included, there is a case where the guest is permitted to temporarily read a document such as a prepared conference memo. In this case, it is troublesome to register the guest or a portable terminal of the guest in the processing apparatus 110 or the higher-level apparatus and to deregister the registration after the reading is over.

Therefore, in the exemplary embodiment, the reading terminal 104 that may be determined as a terminal of the guest is enabled to distribute an eDoc under predetermined limitations.

For example, in the exemplary embodiment, a terminal of the user in the vicinity of the preparation terminal 102 is regarded as a guest terminal, and the guest terminal is added to the option of the distribution destination terminal selection menu 406. Alternatively, a terminal of the user in the vicinity of the processing apparatus 110 is regarded as a guest terminal, and the guest terminal is added to the option of the distribution destination terminal selection menu 406. It is thought that the preparation terminal 102 or the processing apparatus 110 is equipped in a room (for example, a living room of a department, a conference room and the like) of a building of the organization. Therefore, it is assumed that a person in the vicinity of the preparation terminal 102 or the processing apparatus 110 is a person who has entered the room for conference or the like on the basis of rightful permission.

For example, the processing apparatus 110 or the preparation terminal 102 searches for partner terminals with which it is possible to perform communication by using near field communication such as Bluetooth Low Energy (registered trademark). Then, the processing apparatus 110 or the preparation terminal 102 determines, as a guest terminal in the vicinity thereof, the searched partner terminals or a terminal, which has a distance (in the near field communication, a communication device between a host device and a partner may be calculated) from the host device equal to or smaller than a preset threshold, of the partner terminals. In the distribution destination terminal selection menu 406, terminal names of the guest terminals detected by the processing apparatus 110 or the preparation terminal 102 are displayed as the options in a display manner different from the pre-registered reading terminals 104 in the organization. The distributor may select a guest terminal, which is to be set as the distribution destination, from the options.

Here, the processing apparatus 110 or the preparation terminal 102 may select, as the guest terminal, only a terminal, which meets a predetermined condition, of the terminals in the vicinity of the host device, not all the neighbor terminals, as the option of the distribution destination. The predetermined condition may include a condition that versions of a viewer application and other specific software mounted in the terminal are any version or higher, a condition that a terminal should not be included in a predetermined denial terminal list, and the like, for example.

It is generally thought that user who carries the guest terminal has not been registered in the processing apparatus 110, the local user ID server 152 and the like. Therefore, when the processing apparatus 110 receives a request for the eDoc file or the metadata from the guest terminal designated as the distribution destination of the document, the processing apparatus may distribute the data without the user authentication. Also, the processing apparatus 110 incorporates a deletion instruction, which indicates that the eDoc file and the metadata are to be deleted from the guest terminal when a deletion condition is satisfied, into the metadata of the eDoc to be distributed to the guest terminal. The deletion condition includes a condition that a screen display of the eDoc is over, a condition that a predetermined permission time period has elapsed after the distribution is performed, and the like, for example. The guest terminal deletes the eDoc file and the metadata from the guest terminal when the deletion condition is satisfied. Thereby, the leakage risk of the eDoc by the guest terminal is reduced.

<Handling of Request from Terminal Except Distribution Destination Terminal>

The above example relates to the push-type distribution where the processing apparatus 110 distributes the eDoc (or the distribution preparation completion notification corresponding to the eDoc) to the reading terminal 104 designated as the distribution destination by the distributor.

As another example, a pull-type distribution is also considered in which the list of eDocs held in the processing apparatus 110 is provided to the reading terminal 104, in response to a request from the reading terminal 104, and a reading target selected from the list by the user is distributed to the reading terminal 104. In the pull-type distribution, it is also considered that the distribution destination user accesses the processing apparatus 110 from the reading terminal 104, which is not designated as the distribution destination, and requests an eDoc. When the request is issued, the processing apparatus 110 performs following methods.

(Method 1) When the processing apparatus 110 receives a distribution request for an eDoc from the reading terminal 104, the processing apparatus 110 determines whether the reading terminal 104 corresponds to a reading terminal set as a distribution destination by the distribution destination information of the latest metadata of the eDoc. When a determination result is No, the processing apparatus 110 transmits neither the file (body) of the eDoc and the metadata thereof to the reading terminal 104. On the other hand, when a determination result is Yes, the processing apparatus 110 further determines whether the user (or the combination of the user and the reading terminal 104) having issued the distribution request is included in the distribution destination information of the metadata. When the user is included, the distribution is performed, and otherwise, the distribution is not performed.

In Method 1, the eDoc (the body file and the metadata) is not distributed to the reading terminal 104 that does not correspond to the distribution destination designated from the distributor.

(Method 2) Even though the reading terminal 104 having transmitted the distribution request for the eDoc does not correspond to the reading terminal 104 of the distribution destination defined in the distribution destination information of the metadata of the eDoc, when the user having issued the request (i.e., the user who uses the reading terminal 104) is included as the distribution destination in the distribution destination information, the processing apparatus 110 transmits the body file and the metadata of the eDoc. In this case, the processing apparatus 110 incorporates flag information, which indicates that the save is not possible, into the eDoc file and the metadata to be transmitted. The reading terminal 104 displays the eDoc file and the metadata, which include the flag information indicating that the save is not possible, but does not receive a save instruction from the user. Then, when the reading of the user is over, the reading terminal 104 discards the eDoc file and the metadata without saving the same.

In the meantime, instead of the method in which the eDoc file and the metadata, which have been transmitted to the reading terminal 104 not designated as the distribution destination, are not saved in the reading terminal 104, a method of admitting the save once is also considered. Thereafter, when the reading terminal 104 intends to again open the eDoc file, the reading terminal 104 requests the latest metadata of the eDoc (a request for reading permission) from the processing apparatus 110 or the like. At this time, the processing apparatus 110 determines whether a combination of the reading terminal 104 and the user having issued the request is included in the distribution destination information of the metadata, in response to the request. When the combination is not included, the processing apparatus 110 transmits an instruction to delete the eDoc to the reading terminal 104. The reading terminal 104 deletes the file of the saved eDoc and metadata corresponding thereto, in response to the instruction. In the meantime, the processing apparatus 110 may just reply the latest metadata, instead of explicitly transmitting the instruction to delete the eDoc to the reading terminal 104 having requested the latest metadata. In this case, the reading terminal 104 determines whether a combination of the reading terminal and the current user is included in the received latest metadata. When the combination is not included, the reading terminal 104 may delete the file of the saved eDoc, without opening the eDoc.

Figure 18:
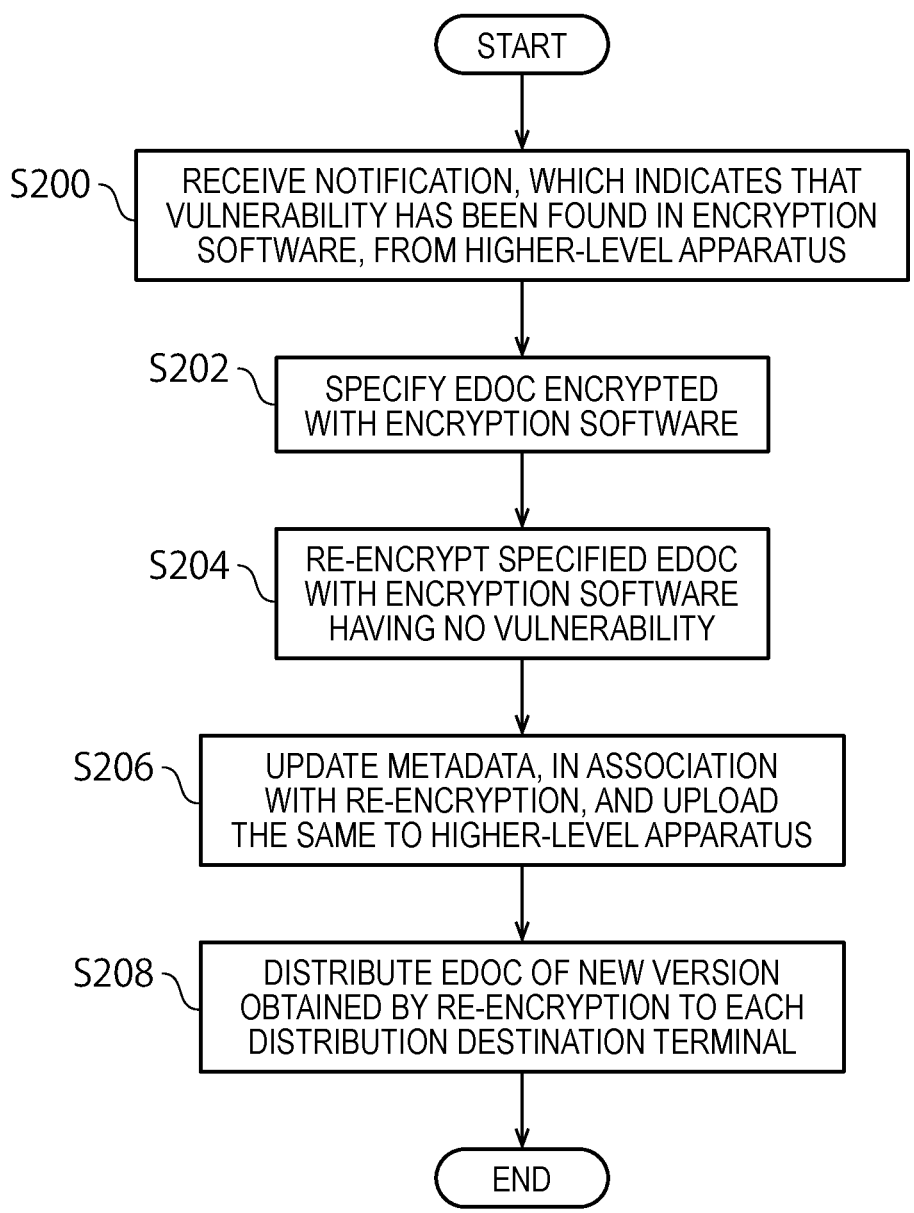
FIG. 18 depicts an example of a flow of processing of the processing apparatus, which is to be executed when vulnerability is found in encryption software.

In the example of FIG. 18, the eDoc file after the re-encryption succeeds to the DID of the eDoc file before the re-encryption. However, the processing apparatus 110 may assign, to the eDoc file after the re-encryption, a DID separate from the eDoc file before the re-encryption. In this case, the processing apparatus 110 transmits an explicit deletion instruction including the DID of the eDoc file before the re-encryption to each reading terminal 104 of the distribution destination so that the eDoc file having vulnerability before the re-encryption does not remain in the reading terminal 104. Also, the processing apparatus 110 records association information, which indicates that the eDoc file after the re-encryption and the eDoc file before the re-encryption correspond to the same document, in the metadata corresponding to the eDoc file after the re-encryption or in the processing apparatus 110 (or the higher-level DID server 220 and local DID server 154). When recording the association information in the metadata corresponding to the eDoc file after the re-encryption, the processing apparatus 110 preferably includes the DID of the eDoc file before the re-encryption in the metadata, as an item of "DID before update", for example.

In the above example, the eDoc file is not distributed to a terminal except the reading terminals 104 that may connect to the local network 108 to which the processing apparatus 110 having the eDoc file registered therein is connected. However, in a special case that the security is to be obtained, the eDoc file may be distributed from the processing apparatus 110 to the reading terminal 104 connected to the other network. An example thereof is described below.

In the example, the processing apparatuses 110 are grouped, and the distribution of the eDoc held by any processing apparatus 110 is permitted to the reading terminal 104 that is connected to the other processing apparatus 110 belonging to the same group, too. The group is prescribed in accordance with a demand of the contractor. For example, the group is defined in as aspect where the processing apparatuses 110 corresponding to the same contractor are set as one group or the processing apparatuses 110 equipped at the same hub (a factory or an office) or department of the company, which is the contractor, are set as one group. Also, when a plurality of contractors collaborates with each other, the processing apparatuses 110 equipped in a collaboration sector of the contractors may be set as one group.

Figure 19:
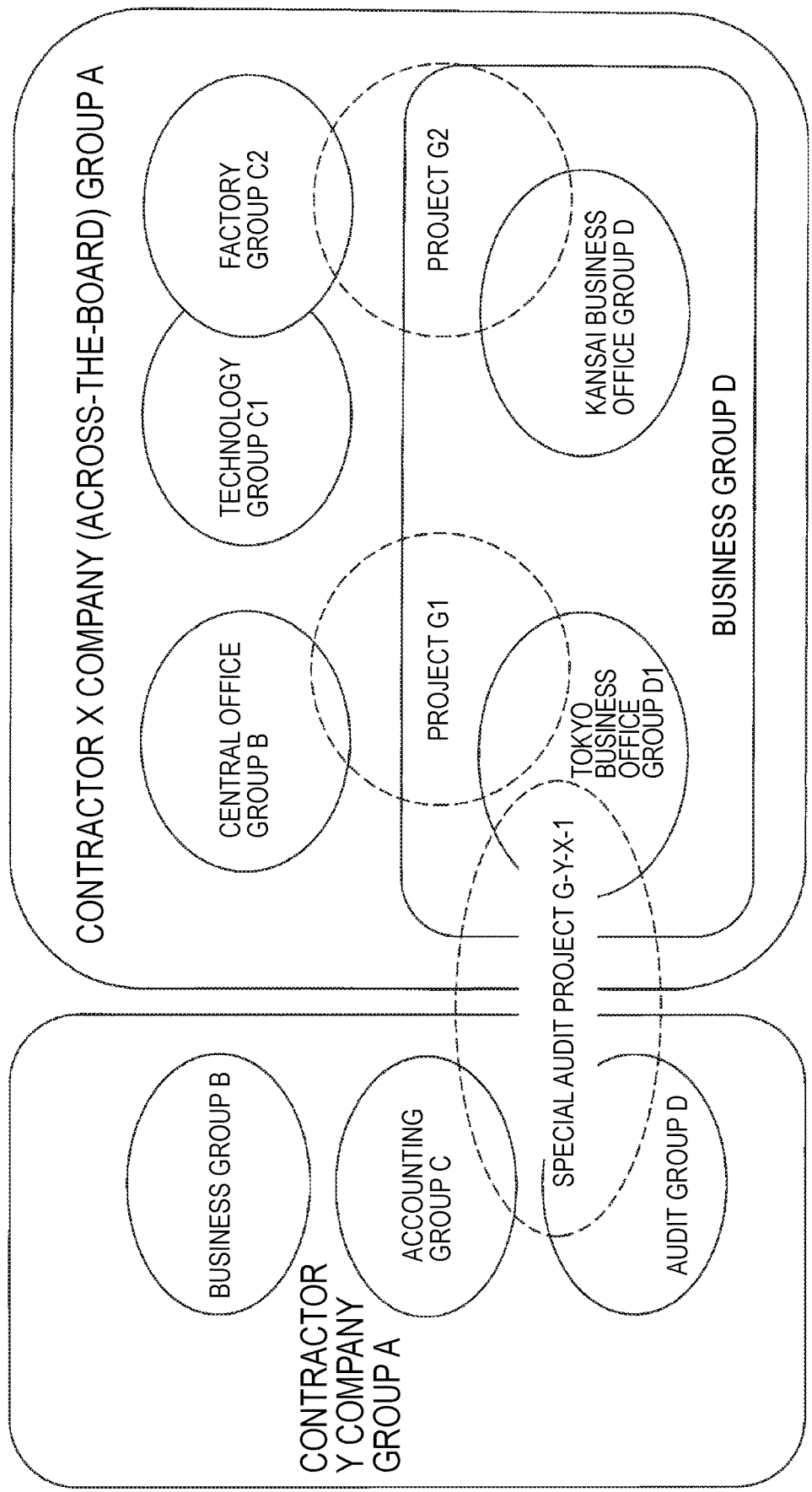
FIG. 19 depicts an example of group setting of the processing apparatus.

FIG. 19 exemplifies groups set for two contractors of X and Y companies. In the example, for the X company, a group A consisting of all the processing apparatuses 110 equipped in the X company is set. Also, a group B consisting of the processing apparatuses 110 equipped in a central office in the X company, and groups C1, C2 and D consisting of the processing apparatuses 110 equipped in a technical sector, a factory sector and a business sector, respectively, are set. The groups B, C1, C2 and D are included in the group A. Also, in the group D of the business sector, a group D1 consisting of the processing apparatuses 110 equipped in a Tokyo business office and a group D2 consisting of the processing apparatuses 110 equipped in a Kansai business office are included. The groups A, B, C1, C2, D, D1 and D2 are groups provided in accordance with the organization configuration of the X company, and are assumed as being substantially lastingly present. Like this, the group that is assumed as being lastingly present is referred to as a fixed group. Meanwhile, in the X company, groups G1 and G2 for temporary project made by the ad-hoc are set. For example, the group G1 includes the processing apparatuses 110 equipped in a sector that takes part in a project team. Like the groups G1 and G2, a group that is assumed as being temporary is referred to as a variable group.

Likewise, in the Y company, four fixed groups, i.e., a group A consisting of all the processing apparatuses 110 equipped in the Y company, and groups B, C and D consisting of the processing apparatuses 110 equipped in a business sector, an accounting sector and an audit sector, respectively, are set. The groups B, C and D are included in the group A.

Also, in the shown example, the X and Y companies collaborate with each other, so that a group G-Y-X-1, which is a variable group over the two companies, is set by the processing apparatuses 110 belonging to the collaboration-related sectors of the respective X and Y companies, so as to perform a special audit project with respect to the collaboration.

Figures 20, 21:
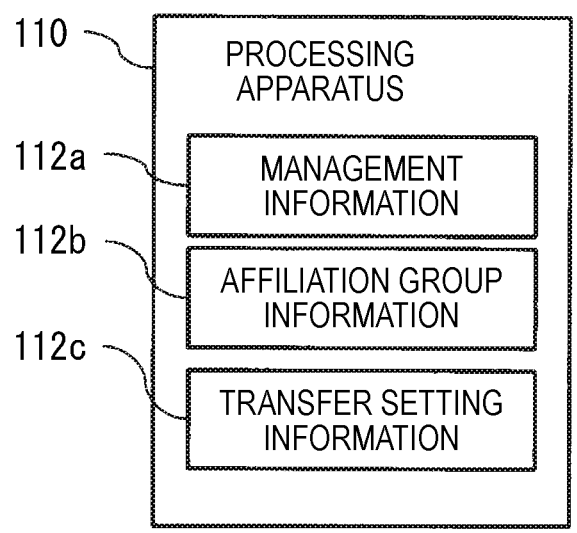
FIG. 20 depicts a variety of information that is to be held for transfer management by the processing apparatus.
FIG. 21 depicts an example of transfer setting information of a processing apparatus.

Meanwhile, in the example, as shown in FIG. 20, affiliation group information 112*b* and transfer setting information 112*c* are held in each of the processing apparatuses 110, in addition to management information 112*a*.

The affiliation group information 112*b* is information indicative of a group to which the processing apparatus 110 belongs. In one example, the affiliation group information provided to the processing apparatus 110 is a list of a group ID to which the processing apparatus 110 belongs. The group ID is identification information for uniquely identifying the group over the world. The global uniqueness of the group ID may be implemented by a type (for example, a serial number of a group in the contractor is synthesized in a contractor ID) including a contractor ID that is unique over the world, for example.

In addition to the group corresponding to the sector in which the processing apparatus 110 is equipped, a group ID of a higher-level group including the corresponding group is also included. For example, in the example of FIG. 19, the affiliation group information of the processing apparatus 110 equipped in the sector, which is also involved in the special audit project, in the Tokyo business office includes group IDs of the four groups, i.e., the groups D1, D, A and G-Y-X-1.

The transfer setting information 112*c* is setting information about a transfer method of transferring an eDoc held by the processing apparatus 110, in response to a request from the other processing apparatus 110. In the example, when the processing apparatus 110 receives a transfer request for an eDoc thereof from the other processing apparatus 110, the processing apparatus 110 replies the eDoc to the request source when the processing apparatus 110 of the request source belongs to the same group as the host device. Here, as described above, the processing apparatus 110 may belong to the plurality of groups. Therefore, the transfer setting information 112*c* is provided so that the transfer method and condition may be differently set for each of the affiliation groups.

FIG. 21 depicts an example of the transfer setting information 112*c*. The shown example is the transfer setting information 112*c* set in the processing apparatus 110 equipped in the sector, which is also involved in the special audit project, in the Tokyo business office of the X company, in the group configuration example of FIG. 19. The processing apparatus 110 belongs to the four groups of the groups D1, D, A, and G-Y-X-1, and any one of three levels "+++", "++", and "+" is set for each of the four groups.

The level "+++" indicates a method of immediately transferring a requested eDoc to a request source with a predetermined transfer protocol. This level is applied to an intimate group consisting of the processing apparatuses 110 that may trust each other. In the meantime, the transfer protocol includes diverse protocols such as FTP, TFTP, FTPS, WebDAV, rsync, SCP and the like, and any of them may be the predetermined transfer protocol. Also, a protocol obtained by changing (for example, encryption of higher level) the protocol so as to improve the safety may be used.

The level "++" indicates a method of checking a state of communication connection with a request source, and transferring a requested eDoc by using a transfer protocol (for example, a transfer protocol having the highest security level) selected from transfer protocols, which may be used by both the host device and the request source, in accordance with a predetermined standard. The method of this level is equivalent to a method that is used in the general data transfer.

The level "+" indicates a method of transferring a requested eDoc to the processing apparatus 110 of the request source only when a request is issued from a person having specific high authority over an eDoc (for example, an owner, i.e., the user who has registered the eDoc in the processing apparatus 110). The protocol that is used for transfer is determined by negotiation with the processing apparatus 110 of the request source, like the level "++". The level "+" is applied to a group including the processing apparatus 110 of which a level of confidence in the security is low.

Also, each of the levels may be associated with a cache time period of the eDoc in the processing apparatus 110 of the transmission destination. For example, the higher the level is, the longer the cache time period is. The high level of the group means that the level of confidence between the processing apparatuses 110 belonging to the group is high. In the above example, the level is higher in order of "+++", "++" and "+".

The processing apparatus 110 transmits the requested eDoc to the request source, together with the information of the cache time period corresponding to the level determined for the request source. The processing apparatus 110 of the request source stores the received eDoc for the cache time period. When a request for the eDoc is received during the cache time period, the processing apparatus 110 responds by using the cached eDoc.

The transfer setting information exemplified in FIG. 21 includes two columns of "coincidence" and "special setting". The column "coincidence" is a column indicative of a level that is applied to the affiliation group coinciding between the processing apparatus 110, which holds therein an eDoc of a transfer request target, and the processing apparatus 110 of the transfer request source. The column "special setting" is a column of a master key-like setting that is used for business audit, management and the like. The column "special setting" enables an eDoc to be transferred from all the processing apparatuses 110 belonging to the fixed group to an apparatus of an auditor or administrator. When the request source is an apparatus of an auditor, it is verified by transmitting special authentication information, which indicates that the apparatus is an auditor with respect to the processing apparatus 110 of the request destination, for example.

The affiliation group information 112*b* and the transfer setting information 112*c* are set for each processing apparatus 110 by the administrator of each processing apparatus 110 or a service person of a business operator who provides a service of the system.

In the meantime, the affiliation group information 112*b* and the transfer setting information 112*c*, which are held by the processing apparatus 110, are registered in the processing apparatus management server 240 of FIG. 6, as items of the status 244 of the status hysteresis 242 corresponding to the processing apparatus ID of the processing apparatus 110.

In the below, processing in which the user registered in any processing apparatus 110 (referred to as "home apparatus") acquires an eDoc in the home apparatus at other hub outside the local network, to which the home apparatus is connected, via the processing apparatus 110 (referred to as "away apparatus") equipped in the other hub is described. In the user ID server 210, an ID of the home apparatus is registered as a predetermined processing apparatus ID of the user (refer to FIG. 4). The user usually connects to the local network 108 to which the home apparatus is connected, and receives the distribution of the eDoc registered in the home apparatus. Here, a flow of a case where when the user goes out to another place, the user receives the distribution of the eDoc from the home apparatus via the away apparatus connected to the local network 108 in the place is described.

Figure 22:
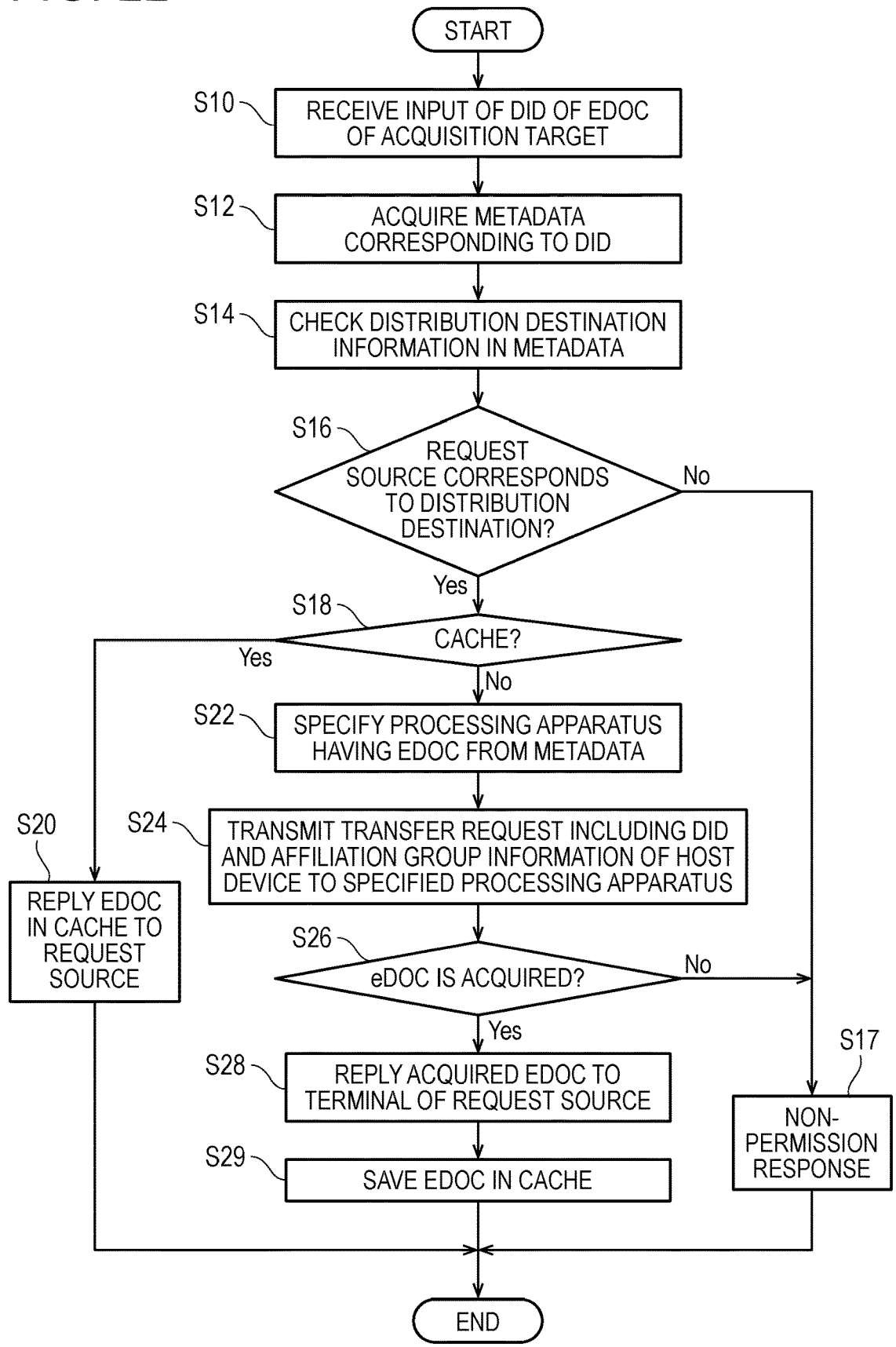
FIG. 22 exemplifies a processing sequence that is to be executed by the processing apparatus corresponding to an away apparatus.

A processing sequence of the away apparatus is described with reference to FIG. 22. In this sequence, the away apparatus receives an input of a DID of an eDoc, which is an acquisition target, from the reading terminal 104 of the user (the user that has not been registered in the away apparatus) (S10). Here, before this step, the away apparatus may authenticate the user who has accessed thereto by using the higher-level user ID server 210. Also, the reading terminal 104 of the user may acquire a list of eDocs for which the user is set as the distribution destination from the metadata server 230 or the home apparatus after the user authentication, present the list to the user and receive a selection of the acquisition target.

Then, the away apparatus acquires the latest metadata, which corresponds to the DID input in S10, from the metadata server 230 (S12), and checks whether the user is included in the distribution destination information (refer to FIG. 3) of the metadata (S14, S16). When it is checked that the user is not included in the distribution destination information, the away apparatus transmits error information, which indicates that the distribution is not permitted, to the reading terminal 104 (S17). The reading terminal 104 displays the information, which indicates that the distribution is impossible, on the screen in accordance with the error information.

When it is checked in S16 that the user is the distribution destination of the eDoc, the away apparatus examines whether a file of the eDoc exists in the cache of the away apparatus (S18). When the eDoc still remains in the cache acquired from the home apparatus, a determination result in S18 is Yes. In this case, the away apparatus replies the eDoc in the cache to the reading terminal 104 (S20). When a determination result in S18 is No, the away apparatus specifies the home apparatus having the eDoc from the metadata (S22). The processing apparatus corresponding to the processing apparatus ID included in the metadata (refer to FIG. 3) is the home apparatus. The away apparatus acquires the address information of the home apparatus from the management system 200, accesses the home apparatus by using the access information, and transmits a transmission request for the eDoc (S24). The transmission request includes the DID of the eDoc and the affiliation group information of the away apparatus.

Then, the away apparatus determines whether the eDoc is provided from the home apparatus, in response to the transmission request (S26). As described later, when the away apparatus does not belong to the group common to the home apparatus, since the home apparatus does not transmit the eDoc to the away apparatus, a determination result in S26 is No. In this case, the away apparatus transmits error information, which indicates that the distribution is not permitted, to the reading terminal 104 (S17). The reading terminal 104 displays the information, which indicates that the distribution is impossible, on the screen in accordance with the error information.

When a determination result in S26 is Yes, the away apparatus replies the eDoc transmitted from the home apparatus to the reading terminal 104 of the request source user (S28). Also, the away apparatus caches the eDoc in the storage thereof (S29). Here, in the case that a cached time period is designated in the eDoc transmitted from the home apparatus, the away apparatus deletes the eDoc from the cache when the cache time period elapses after the eDoc is acquired. The cache time period is determined, independently of the effective term of the eDoc on the reading terminal 104. On the other hand, in the case that a cached time period is not designated, the away apparatus discards the old eDoc, in accordance with a usual cache algorithm such as Least Recently Used.

Figure 23:
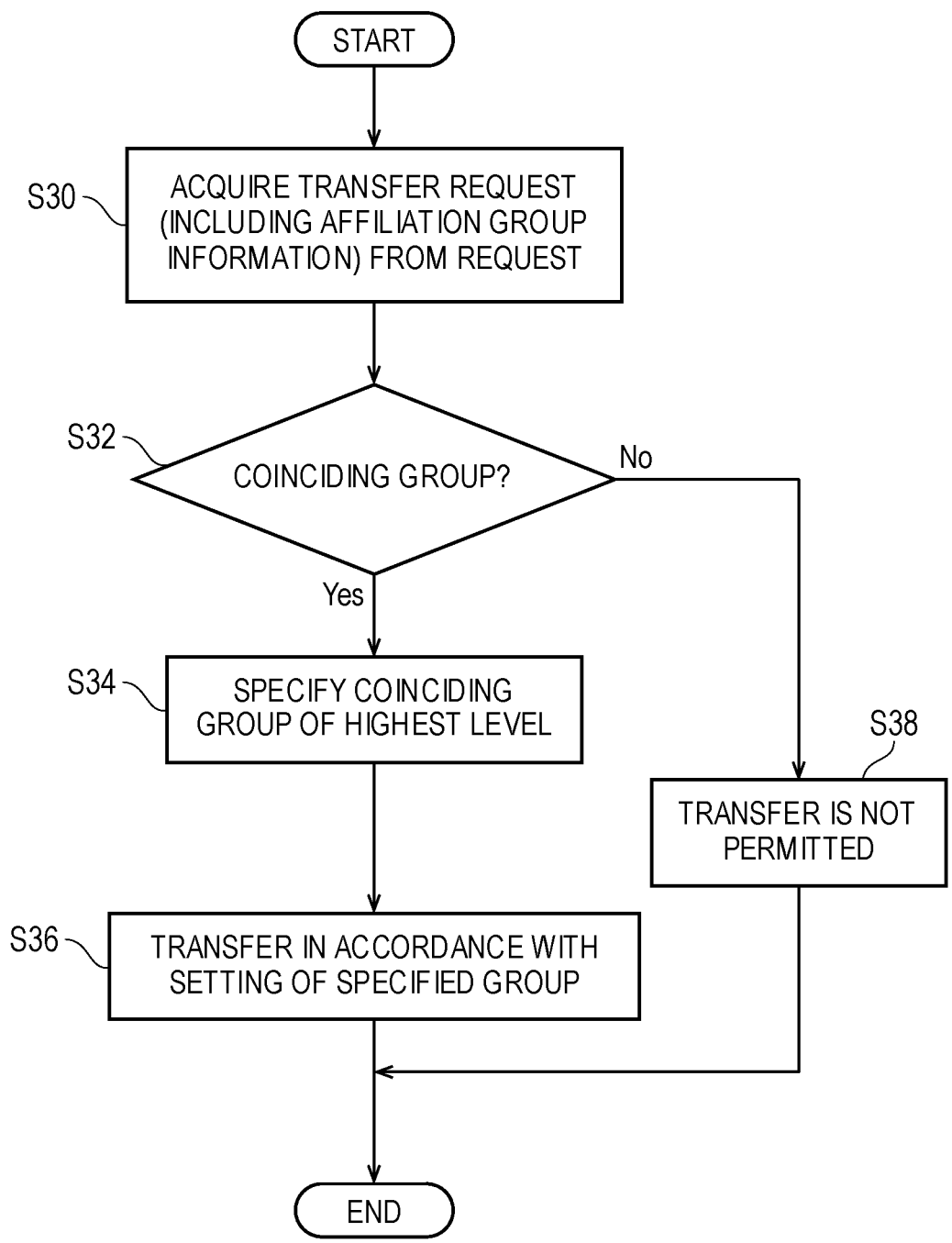
FIG. 23 exemplifies a processing sequence that is to be executed by the processing apparatus corresponding to a home apparatus.

An example of a processing sequence that is to be executed by the home apparatus when the transmission request for the eDoc is received from the away apparatus is described with reference to FIG. 23. When the home apparatus receives the transmission request from the away apparatus (S30), the home apparatus compares the affiliation group information (the information of the away apparatus) in the transmission request with the affiliation group information of the home apparatus, and determines whether there is a group ID coinciding (common to) between both the information (S32). When there is no common group ID, the home apparatus makes a response, which indicates that it is not possible to transmit the requested eDoc, to the away apparatus (S38). In this case, since the away apparatus does not belong to the same group as the home apparatus, the away apparatus is an apparatus that cannot be trusted or is unclear to the home apparatus. Accordingly, the transmission is not permitted.

When a determination result in S32 is Yes, the home apparatus specifies the highest level of the levels of the group ID coinciding between both the information (S34), and transmits the eDoc to the away apparatus by using a transmission method corresponding to the specified level (S36). When a cache time period is set for the specified level, the home apparatus transmits information indicative of the cache time period to the away apparatus, in association with the eDoc. In the meantime, when the highest level specified in S34 is the level "+", the home apparatus determines whether the user ID of the transmission request source corresponds to a person (for example, an owner) having the specific high authority over the eDoc. When a determination result is Yes, the home apparatus proceeds to S36 to transmit the eDoc, and otherwise, proceeds to S38 to make a response, which indicates that the transmission is not permitted.

Meanwhile, in the case of the processing apparatus 110 in which it is necessary to pass a firewall for transmission of the eDoc, a tunneling protocol is incorporated. The tunneling protocol to be incorporated may be any of L2F, PPTP, L2TP, GRE, IPsec and the like. Also, a plurality of tunneling protocols may be incorporated into the processing apparatus 110, and a protocol common to the transmission partner may be selected and used.

Also, in order to improve the transmission stability, an upper limit of a data amount of the eDoc that is to be automatically transmitted by the above processing may be set in correspondence to a type of the transmission protocol to be used for eDoc transmission, whether or not the tunneling protocol is to be used, and/or a type of the tunneling protocol. When the data amount of the eDoc exceeds the upper limit, the eDoc may be divided into parts equal to or smaller than the upper limit, which are then transmitted.

In the above example, the affiliation group information 112b of each processing apparatus 110 includes not only the ID of the group to which the processing apparatus 110 directly belongs but also the IDs of all the groups to which the processing apparatus 110 hierarchically belongs, such as an ID of a wider group to which the group belongs. However, the form of the affiliation group information 112b is just exemplary. Instead of the configuration where the processing apparatus 110 has the affiliation group information 112b, the affiliation group information 112b may be held on a server provided on a network that may be accessed from the processing apparatus 110 and the processing apparatus 110 may refer to the same. Also, the processing apparatus 110 may have only the ID of the group to which the processing apparatus 110 belongs, and may refer to the server on the network with respect to the information of the hierarchical relationship between the groups.

As exemplified above, the processing apparatuses 110 are grouped in accordance with the intention of the contractor, and the eDoc transmission is permitted between the processing apparatuses 110 in the same group. Accordingly, even when the user is at a place, other than the place (for example, a user's office) in which the processing apparatus 110 in which the user has been registered is equipped, a chance that the user will acquire the body of the eDoc increases.

The exemplary embodiment of the present invention has been described. The respective apparatuses exemplified above such as the preparation terminal 102, the reading terminal 104, the processing apparatus 110, the local user ID server 152, the local DID server 154, the local metadata server 156, the user ID server 210, the DID server 220, the metadata server 230, the processing apparatus management server 240 and the like are implemented by enabling a computer to execute programs indicating the functions of the respective apparatuses. Here, the computer has a circuit configuration where a microprocessor such as a CPU, a memory (primary storage) such as a random access memory (RAM) and a read only memory (ROM), a controller configured to control a fixed storage such as a flash memory, an SSD (solid state drive) and a HDD (hard disk drive), a variety of I/O (input/output) interfaces, a network interface configured to perform control for connection with a network such as a local area network, and the like are connected via a bus and the like, for example, as hardware. The program in which the processing contents of the respective functions are described is saved in the fixed storage such as a flash memory via the network or the like, and is installed in the computer. The program stored in the fixed storage is read to the RAM and is executed by the microprocessor such as a CPU, so that the function module groups exemplified above are implemented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor configured to:
allow a user of a transmission source of a document to designate a transmission destination user and a transmission destination terminal; and
transmit the document and transmission destination information indicative of the transmission destination user and the designated transmission destination terminal to an apparatus that transmits the document to the transmission destination terminal; and
acquire, from the apparatus, candidate information indicative of a candidate of the transmission destination terminal and narrowing condition information of the transmission destination terminal,
wherein, when newly adding a candidate except the candidate indicated by the candidate information, select and add only a candidate satisfying the narrowing condition information.

2. The information processing apparatus according to claim 1, wherein the at least one processor is further configured to:
detect a terminal device existing in a vicinity of the information processing apparatus; and
display the detected terminal as a candidate in a different manner from other candidates and allow the user to designate the transmission destination terminal from the candidates displayed.

3. The information processing apparatus according to claim 1, wherein the at least one processor is further configured to:
acquire, from the apparatus, information of a terminal existing in a vicinity of the apparatus; and
display the terminal indicated by the acquired information as a candidate in a different manner from other candidates, and allow the user to designate the transmission destination terminal from the candidates displayed.

4. A protection processing apparatus comprising:
at least one processor configured to:
acquire, from an information processing apparatus, a document and transmission destination information indicative of a transmission destination user and a transmission destination terminal;
generate a protected document by performing protection processing on the document acquired, the protection processing being a processing to make a document unreadable by encryption;
transmit, to the transmission destination terminal, the protected document and metadata for controlling so that, in a case where a combination of a user who is to use the protected document and a terminal device to be used correspond to a combination of the transmission destination user and the transmission destination terminal indicated by the transmission destination information, the protected document is allowed to be read with the terminal device by decryption of the protected document; and
in response to receiving a using request for the document from a terminal, transmit a deletion instruction of the document to the terminal in a case where the terminal does not correspond to the transmission destination terminal indicated by the transmission destination information corresponding to the document.

5. The protection processing apparatus according to claim 4, wherein the at least one processor is further configured to:
in response to a request for the protected document from a terminal device, perform control to transmit the protected document to the terminal in a case where the terminal device corresponds to the transmission destination terminal indicated by the metadata corresponding to the protected document, and do not perform control to transmit the protected document to the terminal device in a case where the terminal device does not correspond to the transmission destination terminal.

6. The protection processing apparatus according to claim 5, further comprising:
a group storage that stores belonging group information indicating a group to which the protection processing apparatus belongs,
wherein the at least one processor is further configured to:
perform control to hold the generated protected document;
in a case where a protected document requested from the terminal device is not held, transmit the belonging group information and a transfer request for the protected document to another protection processing apparatus having generated the protected document; and
transmit the protected document to the terminal device in a case where the protected document is transferred in response to the transfer request.

7. The protection processing apparatus according to claim 6, wherein the at least one processor is further configured to:
perform control to hold the protected document transferred in response to the transfer request in a cache during a cache time period notified in association with the protected document and that deletes the protected document from the cache after the cache time period elapses; and
in a case where the protected document requested from the terminal device is held in the cache while the protected document is not held, allow transmission of the protected document held in the cache to the terminal device.

8. The protection processing apparatus according to claim 4, wherein the at least one processor is further configured to:
assign a flag, which indicates that the protected document is not allowed to be saved at a terminal device except the transmission destination terminal indicated by the transmission destination information, to the protected document or the metadata.

9. The protection processing apparatus according to claim 4, wherein the at least one processor is further configured to:
perform control to save the metadata corresponding to the document; and
transmit, in a case where there is a terminal that is not the transmission destination terminal any more as a result of a change in the saved metadata, an instruction to delete the document to the terminal.

10. The protection processing apparatus according to claim 4, further comprising:
a group storage that stores belonging group information indicating a group to which the protection processing apparatus belongs, wherein the at least one processor is further configured to:

perform control to hold the generated protected document; and in response to receiving belonging group information of other protection processing apparatus and a transfer request for the held protected document from the other protection processing apparatus, transfer the protected document relating to the transfer request to the other protection processing apparatus in a case where the belonging group information of the protection processing apparatus stored in the group storage of the protection processing apparatus and the belonging group information received share a common group.

11. The protection processing apparatus according to claim 10, wherein the at least one processor is further configured to:

transfer the protected document relating to the transfer request to the other protection processing apparatus in a transfer manner corresponding to the common group.

12. The protection processing apparatus according to claim 10, wherein the at least one processor is further configured to:

transmit information of a cache time period corresponding to the common group to the other protection processing apparatus in association with the protected document relating to the transfer request.

13. The protection processing apparatus according to claim 10, wherein the at least one processor is further configured to:

when a condition, which indicates that transfer is permitted only when a user who has requested transfer of the protected document via the other protection processing apparatus has a specific authority over the protected document, is set for the common group, transmit the protected document to the other protection processing apparatus only if a user of a transmission source of the transfer request meets the condition.

14. A terminal device comprising:

at least one process configured to:

receive a protected document and transmission destination information indicative of a transmission destination user and a transmission destination terminal of the protected document;

authenticate a user who uses the terminal device;

perform, in a case where a set of the terminal device and the authenticated user corresponds to a set of the transmission destination user and the transmission destination terminal indicated by the transmission destination information received, control to open the protected document and to allow the user to use the protected document; and perform, in a case where the set of the terminal device and the authenticated user does not correspond to the set of the transmission destination user and the transmission destination terminal indicated by the transmission destination information received, control not to save the protected document.

15. A terminal device comprising:

at least one process configured to:

receive a protected document and transmission destination information indicative of a transmission destination user and a transmission destination terminal of the protected document;

perform control to save the protected document received;

authenticate a user who uses the terminal device;

perform, in a case where a set of the terminal device and the authenticated user authenticated corresponds to a set of the transmission destination user and the transmission destination terminal indicated by the received transmission destination information, control to open the protected document and to allow the user to use the protected document;

transmit a using request for the saved protected document to a protection processing apparatus; and delete, in a case where an unavailable response is issued from the protection processing apparatus in response to the using request, the saved protected document.

* * * * *